United States Patent
Hanaki et al.

(10) Patent No.: US 7,718,567 B2
(45) Date of Patent: May 18, 2010

(54) EXHAUST GAS PURGING CATALYST AND METHOD FOR PRODUCING THE EXHAUST GAS PURGING CATALYST

(75) Inventors: Yasunari Hanaki, Yokohama (JP); Toshiharu Miyamura, Yokohama (JP); Haruhiko Shibayama, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 11/956,575

(22) Filed: Dec. 14, 2007

(65) Prior Publication Data
US 2008/0146439 A1 Jun. 19, 2008

(30) Foreign Application Priority Data
Dec. 15, 2006 (JP) ............................. 2006-337829
Aug. 3, 2007 (JP) ............................. 2007-202993

(51) Int. Cl.
*B01J 23/10* (2006.01)
*B01J 21/04* (2006.01)
*B01J 21/06* (2006.01)
*B01J 23/38* (2006.01)
*B01J 32/00* (2006.01)

(52) U.S. Cl. ................. 502/304; 502/100; 502/325; 502/332; 502/349; 502/439

(58) Field of Classification Search ................. 502/100, 502/304, 325, 332, 349, 439
See application file for complete search history.

(56) References Cited

U.S. PATENT DOCUMENTS

| 5,643,542 | A | * | 7/1997 | Leyrer et al. ................. 423/212 |
| 6,306,794 | B1 | * | 10/2001 | Suzuki et al. ............... 502/304 |
| 6,953,554 | B2 | * | 10/2005 | Wallin et al. ................ 422/177 |

FOREIGN PATENT DOCUMENTS

| EP | 1 364 706 A1 | | 11/2003 |
| JP | 2002-253968 A | | 9/2002 |
| JP | 2004-025013 A | | 1/2004 |
| JP | 2006255610 A | * | 9/2006 |

\* cited by examiner

*Primary Examiner*—Edward M. Johnson
*Assistant Examiner*—Daniel Berns
(74) *Attorney, Agent, or Firm*—Foley & Lardner LLP

(57) ABSTRACT

An exhaust gas purging catalyst, includes: an integrated carrier; and a catalyst coat layer formed on the integrated carrier. The catalyst coat layer includes a catalyst component and meets the following expression (A): $P \geq 0.17W - 0.04$ - - - (A). P denotes a summation (ml) of a capacity of a void per mass (g) of the catalyst coat layer. The void has a pore diameter of 0.1 μm to 1 μm. W denotes a volume (ml) of the catalyst coat layer per the mass (g) of the catalyst coat layer.

6 Claims, 4 Drawing Sheets

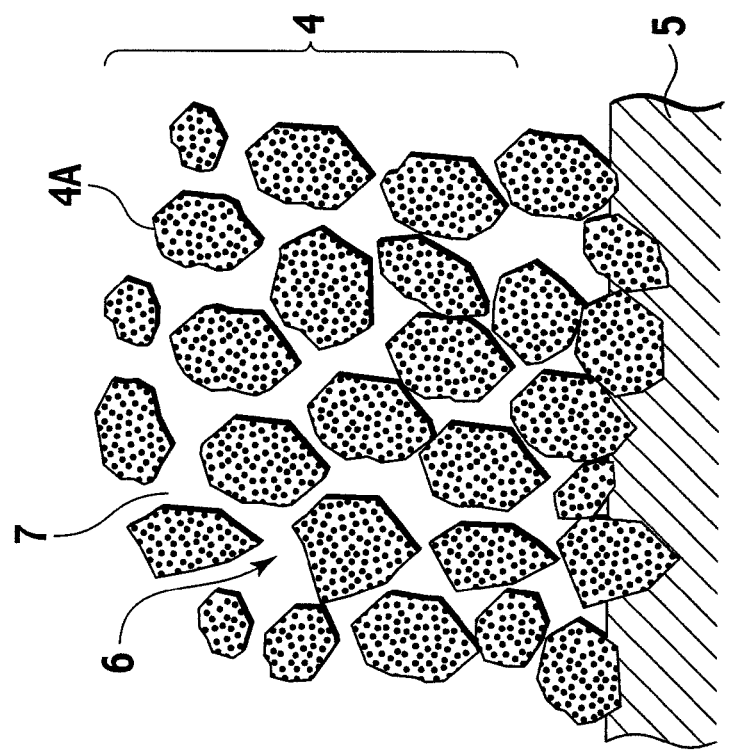
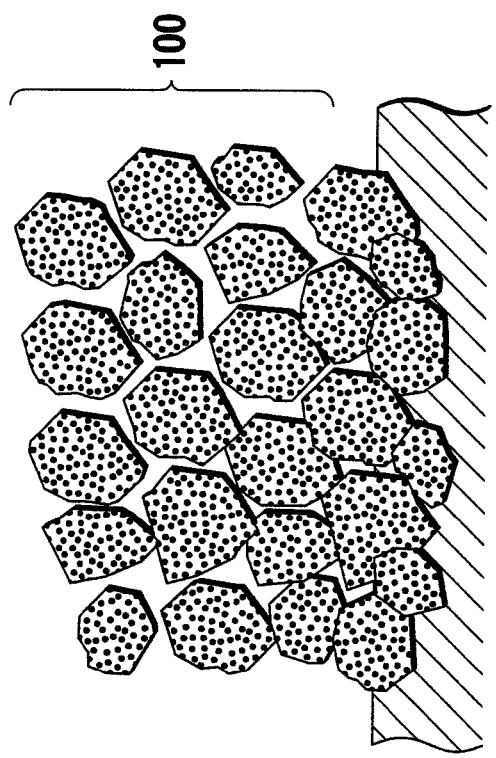
FIG. 1A
RELATED ART
FIG. 1B

GAS FLOWRATE RELATIVE TO CATALYST ACTIVATION

EXHAUST GAS PURGING CATALYST AND METHOD FOR PRODUCING THE EXHAUST GAS PURGING CATALYST

BACKGROUND OF THE INVENTION

1. Field of the Invention

The present invention relates to an exhaust gas purging catalyst and a method for producing the exhaust gas purging catalyst. More in detail, the above exhaust gas purging catalyst includes a catalyst coat layer having a special layer structure.

2. Description of the Related Art

An exhaust gas and the like of an automobile has an extremely high gas flow rate. Therefore, an exhaust gas purging catalyst has to purge the exhaust gas in a short-time contact with the exhaust gas. Is this case, however, the exhaust gas is unlikely to be diffused into an inner part of a catalyst coat layer of the exhaust gas purging catalyst.

In this connection, EP1364706 (family of JP2002253968 [=Japanese Patent Application Laid-Open No. 2002-253968] and WO02070127) and JP2004025013 (=Japanese Patent Application Laid-Open No. 2004-025013) each propose controlling of the pore diameter and pore capacity of the catalyst coat layer, so as to improve exhaust gas diffusing property.

On the other hand, conventionally, the exhaust gas purging catalyst is required to show a high purging performance even when the air-to-fuel ratio is fluctuated. For example, in an oxidation atmosphere (lean atmosphere), a promoter (co-catalyst) having an Oxygen Storage Capacity (though acronymed by OSC, this functionally means oxygen storing and discharging capacity) is disposed adjacent to a noble metal, so as to secure the purging performance.

SUMMARY OF THE INVENTION

It is an object of the present invention to provide an exhaust gas purging catalyst which is excellent in exhaust gas diffusing property and is capable of suppressing sintering of a noble metal.

It is another object of the present invention to provide a method for producing the above exhaust gas purging catalyst.

According to a first aspect of the present invention, an exhaust gas purging catalyst comprises: an integrated carrier; and a catalyst coat layer formed on the integrated carrier. The catalyst coat layer includes a catalyst component and meets a following expression (A): $P \geq 0.17W - 0.04$ - - - (A). P denotes a summation (ml) of a capacity of a void per mass (g) of the catalyst coat layer. The void has a pore diameter of 0.1 μm to 1 μm. W denotes a volume (ml) of the catalyst coat layer per the mass (g) of the catalyst coat layer.

According to a second aspect of the present invention, a method for producing the exhaust gas purging catalyst according to the first aspect comprises: preparing a slurry including: the catalyst component, and at least one of: an active carbon having an average particle diameter of 1.0 μm or less, and a pore former; coating the slurry on the integrated carrier; and firing the slurry.

Other objects and features of the present invention will become understood from the following description with reference to the accompanying drawings.

BRIEF DESCRIPTION OF THE DRAWINGS

FIG. 1A is a schematic cross sectional view of a conventional catalyst coat layer while FIG. 1B is a schematic cross sectional view of a catalyst coat layer under the present invention.

DESCRIPTION OF THE PREFERRED EMBODIMENTS

<Structure of Exhaust Gas Purging Catalyst>

Figure 2A:
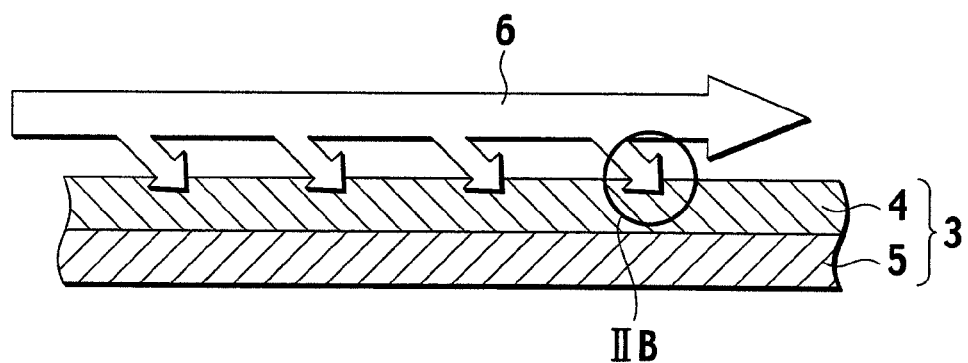
FIG. 2A is a cross sectional view of an exhaust gas purging catalyst including a catalyst coat lawyer and an integrated carrier.

Hereinafter, structure of an exhaust gas purging catalyst 3 is to be set forth in detail under the present invention. In the following description, "%" of concentration, blending quantity, packing quantity and the like denotes mass percentage unless otherwise specified.

The exhaust gas purging catalyst 3 under the present invention includes an integrated carrier 5, and a catalyst coat layer 4 formed on the integrated carrier 5. Moreover, the catalyst coat layer 4 includes a catalyst component 4A and meets the following expression (A):

$$P \geq 0.17W - 0.04 \quad (A)$$

where P denotes a summation (ml) of capacity of void 7 (having a pore diameter of 0.1 μm to 1 μm) per mass (g) of the catalyst coat layer 4, and W denotes a volume (ml) of the catalyst coat layer 4 per mass (g) of the catalyst coat layer 4.

Herein, the integrated carrier 5 may be the one conventionally available, examples thereof including: honeycomb carrier made of ceramic such as cordierite and the like, and honeycomb carrier made of stainless metal and the like.

Moreover, the catalyst coat layer 4 is coated on the integrated carrier 5 and meets the expression (A).

Contrary to the expression (A), $P < 0.17W - 0.04$ suppresses diffusion of an exhaust gas 6 into the catalyst coat layer 4, failing to allow the exhaust gas 6 to sufficiently reach an active point of the catalyst (of the catalyst coat layer 4), resulting in decreased exhaust gas purging efficiency.

FIG. 1A a schematic cross sectional view of a conventional catalyst coat layer 100 while FIG. 1B is a schematic cross sectional view of a catalyst coat layer 4 under the present invention. Compared with the conventional catalyst coat layer 100 in FIG. 1A, the catalyst coat layer 4 under the present invention in FIG. 1B has larger and increased voids 7 between catalyst powder particles (i.e., catalyst components 4A), bringing about an excellent exhaust gas diffusing property. As such, the exhaust gas 6 can sufficiently reach the active point of the catalyst (of the catalyst coat layer 4), thus improving the exhaust gas purging efficiency.

In the catalyst coat layer 4, a catalyst component 4A is granular. These granular catalyst components 4A are in contact with or coupled with each other, thus forming the catalyst coat layer 4 which is porous.

Preferably, in a range of 1 nm to 100 nm, the granular catalyst component 4A of the exhaust gas purging catalyst 3 under the present invention has a peak of pore diameter distribution.

With the pore diameter distribution less than 1 nm, the exhaust gas 6 diffused through the void 7 of the catalyst coat layer 4 fails to be further diffused in the catalyst component 4 A, as the case may be, decreasing the exhaust gas purging efficiency. Meanwhile, with the pore diameter distribution over 100 nm, the exhaust gas 6 diffused through the void 7 of the catalyst coat layer 4 can be diffused in the catalyst component 4A. In this case, however, a contact area between the exhaust gas 6 and the catalyst component 4A is decreased due to the large pore diameter over 100 nm, thereby decreasing the exhaust gas purging efficiency, and decreasing heat resistance which is attributable to particle growth, resulting in decreased activation.

Herein, the catalyst component 4A is not specifically limited, examples thereof including:

1) a noble metal such as platinum (Pt), palladium (Pd), rhodium (Rh) and the like, 2) a cerium-contained oxide such as $CeO_2$ or Ce which contains Zr, La, Nd, Pr, Y and the like, and 3) at least one of aluminum oxide and zirconium oxide such as $\gamma$-$Al_2O_3$, Ce added $Al_2O_3$, La added $Al_2O_3$, Zr—La compound oxide, Zr—La—Ce compound oxide, Zr—La—Nd compound oxide and the like.

The cerium-contained oxide mainly serves as a promoter (co-catalyst). For example, when added to $\gamma$-$Al_2O_3$, the cerium-contained oxide helps improve durability of $Al_2O_3$.

In the exhaust gas purging catalyst 3 under the present invention, a noble metal 1 of the catalyst coat layer 4 preferably has an average granular particle diameter of 2 nm to 10 nm, and a cerium-contained oxide 2 preferably has an average granular particle diameter of 5 nm to 30 nm.

Moreover, it is preferable that the noble metal 1 is in contact with or coupled with the cerium-contained oxide 2. It is also preferable that the above cerium-contained oxide 2 in contact with or coupled with the noble metal 1 is coated with at least one of the aluminum oxide and the zirconium oxide which are described above.

Figure 2B:
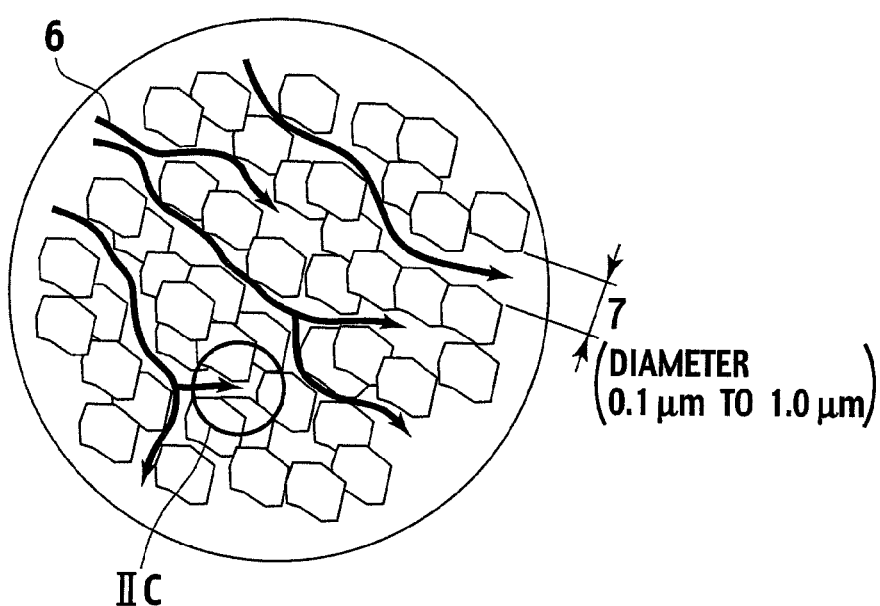
FIG. 2B is an enlarged cross sectional view of a part of the catalyst coat layer as indicated by IIB in FIG. 2A.
Figure 2C:
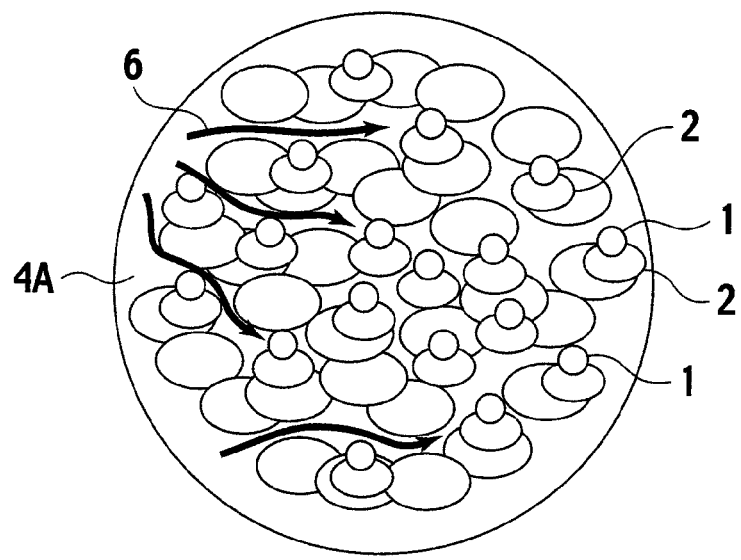
FIG. 2C is a further enlarged view of FIG. 2B as indicated by IIC in FIG. 2B.

FIG. 2A, FIG. 2B and FIG. 2C show schematic cross sectional views of the catalyst coat layer 4 and the like of the exhaust gas purging catalyst 3, according to an embodiment of the present invention. Specifically, FIG. 2A is a cross sectional view of the exhaust gas purging catalyst 3 including the catalyst coat layer 4 and integrated carrier 5, FIG. 2B is an enlarged cross sectional view of a part of the catalyst coat layer 4, and FIG. 2C is a further enlarged view of FIG. 2B.

As shown in FIG. 2B and FIG. 2C, the cerium-contained oxide particle 2 is coupled with the noble metal particle 1, bringing about what is called an anchor effect, thereby suppressing movement of the noble metal particle 1 for stabilization thereof. Besides, in FIG. 2B and FIG. 2C, at least one of the Al oxide and the Zr oxide (though not shown in FIG. 2B and FIG. 2C, the above oxide is denoted by "9" in FIG. 3A and FIG. 3B) coating the noble metal particle 1 coupled with the cerium-contained oxide particle 2 physically binds the noble metal particle 1 for stabilization thereof.

Figure 3A:
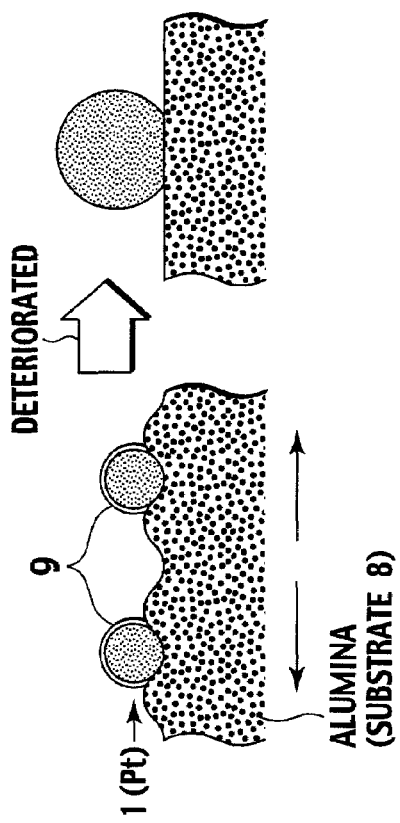
FIG. 3A and FIG. 3B each show a sintering operation (mechanism), a factor of deteriorating a noble metal particle.
Figure 3B:
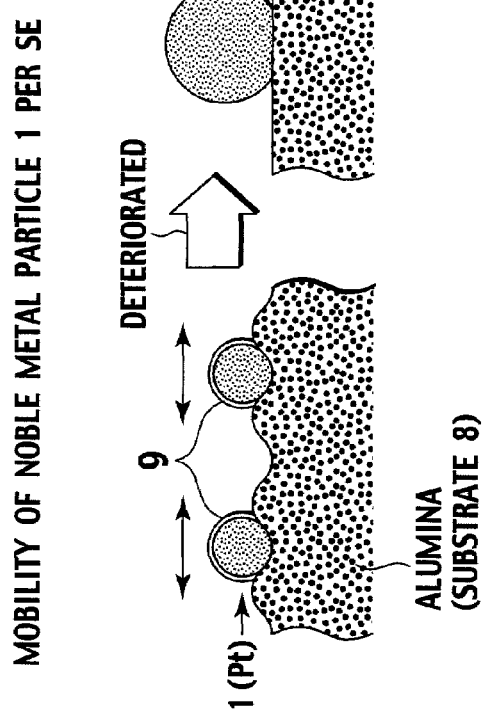

FIG. 3A and FIG. 3B show the following sintering operations (mechanisms), a factor of deteriorating the noble metal particle 1:

1) In FIG. 3A A thermal hysteresis moves the noble metal particle 1 (Pt in FIG. 3A) carried on a substrate 8 made of alumina ($Al_2O_3$) and the like, then a mutual aggregation of the noble metal particles 1 is caused (i.e., the noble metal particles 1 are enlarged) to thereby cause a deactivation, and 2) In FIG. 3B i) A shrink attributable to thermal hysteresis or ii) a specific surface decrease attributable to thermal hysteresis moves the substrate 8 per se made of alumina and the like, then the noble metal particles 1 carried on the substrate 8 are so aggregated to be enlarged to thereby cause the deactivation.

According to the embodiment, the anchor effect by the cerium-contained oxide particle 2 effectively suppresses the sintering attributable the movement of noble metal particle 1 per se in FIG. 3A.

Meanwhile, at least one of the Al oxide 9 and the Zr oxide 9 coating the noble metal particle 1 coupled with the cerium-contained oxide particle 2 effectively suppresses the sintering (FIG. 3B) attributable to the movement of the substrate 8 (corresponding to the cerium-contained oxide particle 2 according to the embodiment), as set forth above.

As set forth above, according to the embodiment, the noble metal 1 and the cerium-contained oxide 2 which serves as a promoter form a core shell structure. This promoter 2 brings about the anchor effect, thus effectively suppressing the sintering of the noble metal 1.

Moreover, the anchor effect brought about by the promoter 2 that is present adjacent to the noble metal 1 is caused only in an oxidation atmosphere (lean atmosphere). However, according to the embodiment, at least one of the Al oxide 9 and the Zr oxide 9 subsumes the compound particle including the noble metal 1 and the promoter 2. Therefore, the above physical binding force can suppress the sintering of the noble metal 1 even in a reduction atmosphere (rich atmosphere) causing no anchor effect.

As set forth above, with the catalyst coat layer 4, the granular noble metal 1 preferably has an average particle diameter of 2 nm to 10 nm for suppressing the sintering attributable to the movement of the noble metal particle 1. Herein, the noble metal 1 having an average particle diameter of less than 2 nm promotes the sintering, while more than 10 nm as the case may be decreases reactivity between the noble metal 1 and the exhaust gas 6.

Meanwhile, the granular cerium-contained oxide 2 having an average particle diameter of 5 nm to 30 nm sufficiently brings about the anchor effect, and 5 nm to 15 nm strengthens the anchor effect.

This average particle diameter more than 30 nm excessively increases quantity of the noble metal 1 present on the cerium-contained oxide 2, thus decreasing distance between the noble metals 1, as the case may be, resulting in promotion of the sintering.

<Method for Producing Exhaust Gas Purging Catalyst>

Then, a method for producing the exhaust gas purging catalyst 3 under the present invention is to be set forth.

A slurry including i) the catalyst component 4A and ii) an active carbon having an average particle diameter of 1.0 µm or less are prepared, then this slurry is coated on the integrated carrier 5, followed by firing.

Herein, an average particle diameter of 1.0 µm or less of the active carbon is directed to forming, in the catalyst coat layer 4, the void 7 having a pore diameter of 0.1 µm to 1.0 µm. The active carbon's average particle diameter more than 1.0 µm makes the void 7 too large in the catalyst coat layer 4, leading to decreased physical strength such as exfoliation and the like of the catalyst coat layer 4, resulting in decreased durability of the catalyst coat layer 4.

Herein, a firing temperature is not especially limited, examples thereof including 300° C. to 500° C.

Moreover, other than the active carbon, a pore former may be used which is capable of forming the void 7 (having pore diameter of 0.1 µm to 1.0 µm) in the catalyst coat layer 4. For example, using a surfactant (pore former) for forming the void 7 in the slurry and keeping the void 7 until the firing is allowed. The surfactant is not especially limited, examples thereof including those of anion series, cation series and nonion series.

EXAMPLES

Hereinafter, the present invention is to be set forth more in detail referring to the following examples and comparative examples. The present invention is, however, not limited thereto.

Example 1

Polyvinyl pyrrolidone and dinitrodiamine platinum were inputted to a mixed dispersive solution including water:ethanol=1:1 (weight ratio), followed by stirring. Then, hydrazine was added thereto for reduction, to thereby prepare a Pt particulate dispersive solution having an average particle diameter of 2.1 nm.

Aluminum isopropoxide (hereinafter referred to as "AIP" for short) was dissolved in 2-methyl-2,4-pentane diol, followed by heating at 120° C. and stirring. Then, acetyl acetonate cerium (hereinafter referred to as "AAC" for short) was inputted, followed by heating and stirring.

The above Pt particulate dispersive solution was added to the thus obtained solution, followed by a hydrolysis. Then, the thus obtained gel was subjected to a decompression drying at 150° C., then was fired at 300° C. for 1 hr and at 400° C. for another 1 hr, to thereby prepare Pt (0.3%)/$CeO_2$ (20%)/$Al_2O_3$ powder (powder a).

Moreover, polyvinyl pyrrolidone and rhodium nitrate aqueous solution were inputted to a mixed dispersive solution including water:ethanol=1:1 (weight ratio), followed by stirring. Then, hydrazine was added thereto for reduction, to thereby prepare a Rh particulate dispersive solution having an average particle diameter of 3.5 nm. AIP was dissolved in 2-methyl-2,4-pentane diol, followed by heating and 120° C. and stirring. Then, zirconium isopropoxide was inputted, followed by heating and stirring. The above Rh particulate dispersive solution was added to the thus obtained solution, followed by a hydrolysis. Then, the thus obtained gel was subjected to a decompression drying at 150° C., then was fired at 300° C. for 1 hr and at 400° C. for another 1 hr, to thereby prepare a Rh (0.3%)/$ZrO_2$ (20%)/$Al_2O_3$ powder (powder b).

150 g of the above Pt (0.3%)/$CeO_2$ (20%)/$Al_2O_3$ powder (powder a), 30 g of the above Rh (0.3%)/$ZrO_2$ (20%)/$Al_2O_3$ powder (powder b), 180 g of nitric acid aluminasol (sol obtained by adding 20 g or less of nitric acid to boehmite alumina 10% and by adjustment and this sol is 18 g by $Al_2O_3$ conversion), 36 g of an active carbon having an average particle diameter of 1.0 μm and 495 g of deionized water were inputted to a magnetic ball mill, followed by mixing and shattering, to thereby prepare a slurry solution. The slurry solution was adhered to a monolithic carrier (number of cells: 400 cell, 4 mil), and an excessive slurry in the cell was removed by an airflow, followed by drying and still followed by firing at 400° C. for 1 hr. Then, 198 g/L of coat layer was applied to the thus obtained, to thereby prepare an exhaust gas purging catalyst used for the present invention.

Example 2

Manganese nitrate aqueous solution was impregnated to the powder a obtained in the example 1. Then, the thus obtained was dried one night at 120° C., followed by firing at 400° C. for 1 hr, to thereby prepare Pt (0.3%)/Mn (5%) $CeO_2$ (20%)/$Al_2O_3$ powder (powder a1).

Operations like those of the example 1 were repeated, except that the powder a1 was used in place of the powder a, to thereby prepare an exhaust gas purging catalyst.

Example 3

Operations like those of the example 2 were repeated, except that cobalt nitrate was used in place of manganese nitrate, to thereby prepare Pt (0.3%)/Co (5%) $CeO_2$ (20%)/$Al_2O_3$ powder (powder a2). Operations like those of the example 1 were repeated, except that the powder a2 was used in place of the powder a, to thereby prepare an exhaust gas purging catalyst.

Example 4

Operations like those of the example 2 were repeated, except that nickel nitrate was used in place of manganese nitrate, to thereby prepare Pt (0.3%)/Ni (5%) $CeO_2$ (20%)/$Al_2O_3$ powder (powder a3). Operations like those of the example 1 were repeated, except that the powder a3 was used in place of the powder a, to thereby prepare an exhaust gas purging catalyst.

Example 5

Operations like those of the example 2 were repeated, except that iron nitrate was used in place of manganese nitrate, to thereby prepare Pt (0.3%)/Fe (5%) $CeO_2$ (20%)/$Al_2O_3$ powder (powder a-4). Operations like those of the example 1 were repeated, except that the powder a-4 was used in place of the powder a, to thereby prepare an exhaust gas purging catalyst.

Example 6

Polyacrylic acid and dinitrodiamine platinum were inputted to a mixed dispersive solution including water:ethanol=1:1 (weight ratio), followed by stirring. Then, hydrazine was added thereto for reduction, to thereby prepare a Pt particulate dispersive solution having an average particle diameter of 2.1 nm. Moreover, cerium acetate was inputted, to thereby allow the polyacrylic acid to hold the cerium.

AIP was dissolved in 2-methyl-2,4-pentane diol, followed by heating at 120° C. and stirring. Then, AAC was inputted, followed by heating and stirring.

The above Pt particulate dispersive solution was added to the thus obtained solution, followed by a hydrolysis. Then, the thus obtained gel was subjected to a decompression drying at 150° C., then was fired at 300° C. for 1 hr and at 400° C. for another 1 hr, to thereby prepare Pt (0.3%)/$CeO_2$ (21%)/$Al_2O_3$ powder (powder a5). Operations like those of the example 1 were repeated, except that the powder a5 was used in place of the powder a, to thereby prepare an exhaust gas purging catalyst.

Example 7

A cerium nitrate was inputted to an alumina dispersed in water, such that $CeO_2$ was made which was 20% relative to the alumina. The thus obtained was stirred for 2 hrs, followed by drying at 120° C. one daytime and one night, and still followed by firing in an air at 600° C. for 2 hrs.

The thus fired powder was dispersed in water, and dinitrodiamine platinum aqueous solution was inputted thereto. The thus obtained was stirred for 2 hrs, followed by drying at 120° C. one daytime and one night. Then, the thus obtained was fired in air at 400° C. for 1 hr, to thereby prepare Pt (0.3%)/$CeO_2$ (20%)-$Al_2O_3$ powder (powder c).

Moreover, zirconium acetate sol was inputted to an alumina dispersed in water, such that $ZrO_2$ was made which was 10% relative to the alumina. The thus obtained was stirred for 2 hrs, followed by drying at 120° C. one daytime and one night, and still followed by firing in an air at 900° C. for 2 hrs. The thus fired powder was dispersed in water, and rhodium nitrate aqueous solution was inputted thereto. The thus obtained was stirred for 2 hrs, followed by drying at 120° C. one daytime and one night. Then, the thus obtained was fired in air at 400° C. for 1 hr, to thereby prepare a Rh (0.3%)/$ZrO_2$ (10%) —$Al_2O_3$ powder (powder d).

Operations like those of the example 1 were repeated, except that the powder c was used in place of the powder a and the powder d was used in place of the powder b, to thereby prepare an exhaust gas purging catalyst.

Example 8

A cerium nitrate was inputted to an alumina dispersed in water, such that $CeO_2$ was made which was 8% relative to the alumina. The thus obtained was stirred for 2 hrs, followed by drying at 120° C. one daytime and one night, and still followed by firing in an air at 600° C. for 2 hrs.

The thus fired powder was dispersed in water, and palladium nitrate aqueous solution was inputted thereto. The thus obtained was stirred for 2 hrs, followed by drying at 120° C. one daytime and one night. Then, the thus obtained was fired in air at 400° C. for 1 hr, to thereby prepare Pd (0.66%)/$CeO_2$ (8%)—$Al_2O_3$ powder (powder e).

Moreover, zirconium acetate sol was inputted to an alumina dispersed in water, such that $ZrO_2$ was made which was 10% relative to the alumina. The thus obtained was stirred for 2 hrs, followed by drying at 120° C. one daytime and one night, and still followed by firing in an air at 900° C. for 2 hrs. The thus fired powder was dispersed in water, and rhodium nitrate aqueous solution was inputted thereto. The thus obtained was stirred for 2 hrs, followed by drying at 120° C. one daytime and one night. Then, the thus obtained was fired in air at 400° C. for 1 hr, to thereby prepare a Rh (0.3%)/$ZrO_2$ (10%) —$Al_2O_3$ powder (powder d).

Operations like those of the example 1 were repeated, except that the powder e was used in place of the powder a and the powder d was used in place of the powder b, to thereby prepare an exhaust gas purging catalyst.

Example 9

Operations like those of the example 1 were repeated, except that 18 g of the active carbon was used, to thereby prepare an exhaust gas purging catalyst.

Example 10

Operations like those of the example 1 were repeated, except that 4.0 μm of an average particle diameter of the active carbon was used, to thereby prepare an exhaust gas purging catalyst.

Comparative Example 1

Polyvinyl pyrrolidone and dinitrodiamine platinum were inputted to a mixed dispersive solution including water:ethanol=1:1 (weight ratio), followed by stirring. Then, hydrazine was added thereto for reduction, to thereby prepare a Pt particulate dispersive solution having an average particle diameter of 2.1 nm.

Aluminum isopropoxide (hereinafter referred to as "AIP" for short) was dissolved in 2-methyl-2,4-pentane diol, followed by heating at 120° C. and stirring. Then, acetyl acetonate cerium (hereinafter referred to as "AAC" for short) was inputted, followed by heating and stirring.

The above Pt particulate dispersive solution was added to the thus obtained solution, followed by a hydrolysis. Then, the thus obtained gel was subjected to a decompression drying at 150° C., then was fired at 300° C. for 1 hr and at 400° C. for another 1 hr, to thereby prepare Pt (0.3%)/$CeO_2$ (20%)/$Al_2O_3$ powder (powder a).

Moreover, polyvinyl pyrrolidone and rhodium nitrate aqueous solution were inputted to a mixed dispersive solution including water:ethanol=1:1 (weight ratio), followed by stirring. Then, hydrazine was added thereto for reduction, to thereby prepare a Rh particulate dispersive solution having an average particle diameter of 3.5 nm. AIP was dissolved in 2-methyl-2,4-pentane diol, followed by heating at 120° C. and stirring. Then, zirconium isopropoxide was inputted, followed by heating and stirring. The above Rh particulate dispersive solution was added to the thus obtained solution, followed by a hydrolysis. Then, the thus obtained gel was subjected to a decompression drying at 150° C., then was fired at 300° C. for 1 hr and at 400° C. for another 1 hr, to thereby prepare a Rh (0.3%)/$ZrO_2$ (20%)/$Al_2O_3$ powder (powder b).

150 g of the above Pt (0.3%)/$CeO_2$ (20%)/$Al_2O_3$ powder (powder a), 30 g of the above Rh (0.3%)/$ZrO_2$ (20%)/$Al_2O_3$ powder (powder b), 180 g of nitric acid aluminasol (sol obtained by adding 20 g or less of nitric acid to boehmite alumina 10 % and by adjustment and this sol is 18 g by $Al_2O_3$ conversion) and 495 g of deionized water were inputted to a magnetic ball mill, followed by mixing and shattering, to thereby prepare a slurry solution. The slurry solution was adhered to a monolithic carrier (number of cells: 400 cell, 4 mil), and an excessive slurry in the cell was removed by an airflow, followed by drying and still followed by firing at 400° C. for 1 hr. Then, 198 g/L of coat layer was applied to the thus obtained, to thereby prepare an exhaust gas purging catalyst.

Comparative Example 2

A cerium nitrate was inputted to an alumina dispersed in water, such that $CeO_2$ was made which was 8% relative to the alumina. The thus obtained was stirred for 2 hrs, followed by drying at 120° C. one daytime and one night, and still followed by firing in an air at 600° C. for 2 hrs.

The thus fired powder was dispersed in water, and palladium nitrate aqueous solution was inputted thereto. The thus obtained was stirred for 2 hrs, followed by drying at 120° C. one daytime and one night. Then, the thus obtained was fired in air at 400° C. for 1 hr, to thereby prepare Pt (0.66%)/$CeO_2$ (8%)-$Al_2O_3$ powder (powder e).

Moreover, zirconium acetate sol was inputted to an alumina dispersed in water, such that $ZrO_2$ was made which was 10% relative to the alumina. The thus obtained was stirred for 2 hrs, followed by drying at 120° C. one daytime and one night, and still followed by firing in an air at 900° C. for 2 hrs. The thus fired powder was dispersed in water, and rhodium nitrate aqueous solution was inputted thereto. The thus obtained was stirred for 2 hrs, followed by drying at 120° C. one daytime and one night. Then, the thus obtained was fired in air at 400° C. for 1 hr, to thereby prepare a Rh (0.3%)/$ZrO_2$ (10%) —$Al_2O_3$ powder (powder d).

Operations like those of the example 1 were repeated, except that the powder e was used in place of the powder a and the powder d was used in place of the powder b, to thereby prepare an exhaust gas purging catalyst.

The following table 1 shows specifications of the thus obtained catalyst of each of the examples and comparative examples, and P calculated according the expression (A).

TABLE 1

| Examples and comparative examples | Noble metal | Carrier concentration (%) | Noble metal | Carrier concentration (%) | P | Base metal B | Base metal carrier concentration (%) | Promoter component C | Carrier concentration (%) as oxide of C | Main component of carrier substrate |
|---|---|---|---|---|---|---|---|---|---|---|
| Example 1 | Pt | 0.3 | Rh | 0.3 | 0.29 | — | — | Ce | 20 | Alumina |
| Example 2 | Pt | 0.3 | Rh | 0.3 | 0.27 | Mn | 5 | Ce | 20 | Alumina |
| Example 3 | Pt | 0.3 | Rh | 0.3 | 0.29 | Co | 5 | Ce | 20 | Alumina |
| Example 4 | Pt | 0.3 | Rh | 0.3 | 0.3 | Ni | 5 | Ce | 20 | Alumina |
| Example 5 | Pt | 0.3 | Rh | 0.3 | 0.27 | Fe | 5 | Ce | 20 | Alumina |
| Example 6 | Pt | 0.3 | Rh | 0.3 | 0.28 | — | — | Ce | 21 | Alumina |
| Example 7 | Pt | 0.3 | Rh | 0.3 | 0.29 | Ni | — | Ce | 20 | Alumina |
| Example 8 | Pd | 0.3 | Rh | 0.3 | 0.3 | — | — | Zr | 10 | Alumina |
| Example 9 | Pt | 0.3 | Rh | 0.3 | 0.16 | — | — | Ce | 20 | Alumina |
| Example 10 | Pt | 0.3 | Rh | 0.3 | 0.28 | — | — | Ce | 20 | Alumina |
| Comparative example 1 | Pt | 0.3 | Pt | 0.3 | 0.09 | — | — | Ce | 20 | Alumina |
| Comparative example 2 | Pt | 0.3 | Pt | 0.3 | 0.0 | Mn | 5 | Ce | 20 | Alumina |

(Endurance Test Conditions)

| | |
|---|---|
| Engine displacement: | 3000 cc |
| Fuel: | Clear gasoline |
| Catalyst inlet gas temperature: | 700° C. |
| Test period | 100 hrs |
| Inlet gas composition CO: | 0.5% ± 0.1% |
| $O_2$: | 0.% ± 0.1% |
| HC: | about 1100 ppm |
| NO: | 1300 ppm |
| $CO_2$: | 15% |
| A/F (air-to-fuel ratio) fluctuation: | 5500 (Period: 65 second) |
| Frequency: | A/F = 14.6   55 second |
| | **Fuel cut   5 second |
| | Rich spike   5 second (CO = 2%) |

**Cutting fuel supply so as to decrease fuel consumption.

[Volume of Catalyst Coat Layer]

Volume of the catalyst coat layer was obtained by the following operations: 1) shooting cross section of a honeycomb catalyst, 2) thereby obtaining area of the catalyst coat layer, and 3) multiplying the area by length of honeycomb catalyst.

[Measurement of Diameter of Catalyst Component Particle]

*TEM-EDX Measurement

Catalyst powder was sampled in such a manner that the catalyst coat layer alone was exfoliated (or scraped) from the honeycomb catalyst.

The catalyst powder was embedded in an epoxy resin, forming an ultra-thin scrap by means of an ultra microtome.

This scrap was used for studying dispersion state of each crystalline particles by a transmission electron microscope (TEM). That is, among the thus obtained images, point was focused on a contrast part (shade) and the kind of metals was limited, to thereby specify particle diameter of the metal. The following device and conditions were used.

| | |
|---|---|
| * Device: | HF-2000 made by Hitachi, Ltd |
| * Acceleration voltage: | 200 kV |
| * Cutting condition: | Cold (normal temperature) |

[Capability of Suppressing Sintering]

The catalysts according the example 1 and comparative example 1 were used, measuring an average particle diameter of Pt at 400° C. (Initial period) and 900° C. (After endurance test). Table 2 shows thus obtained results.

The catalysts according the example 1 and example 6 were subjected to the evaluation likewise. Table 3 shows thus obtained results.

TABLE 2

| | Diameter of Pt (nm) | |
|---|---|---|
| Examples and comparative examples | 400° C. (Initial period) | 900° C. (After endurance test) |
| Example 1 | 1.4 | 4.3 |
| Comparative example 1 | 1.3 | 9.0 |

According to each of the examples within the range of the present invention, a noble metal particle is formed at first, and alumina is formed around the noble metal particle, thereby suppressing movement of the noble metal particle. Moreover, ceria alumina having high heat resistance can be formed around the noble metal particle. The thus formed ceria alumina can suppress sintering which may be caused by movement of the substrate (foundation), thus further suppressing deterioration of the noble metal particle.

Moreover, unlike the comparative example 1, each of the examples within the range of the present invention is capable of highly dispersing ceria-zirconia (as a promoter) in the alumina ($Al_2O_3$) as a main component of the carrier substrate, thus also suppressing the movement of the noble metal particle.

TABLE 3

| | Diameter of Pt (nm) | |
|---|---|---|
| Examples | 400° C. (Initial period) | 900° C. (After endurance test) |
| Example 1 | 1.4 | 4.3 |
| Example 6 | 1.3 | 3.3 |

According to the example 6 within the range of the present invention, a promoter component (Ce) is contained in a colloidal particle. In the firing, however, the promoter component (Ce) forms an oxide around Pt, locally showing an effect of solidifying-dissolving with Pt and fixing with Pt.

Besides, for allowing the colloidal particle to contain Ce, a polymer showing ionic changeability such as carboxyl group and the like can be used for a proper protective polymer, examples of the polymer including polyacrylic acid.

[Evaluation of Catalytic Activation]

A model reactive gas in the following table 4 was used for calculating NOx purge ratio (ηNOx) from room temperature to 450° C. by the following expression. Table 5 shows thus obtained results.

ηNOx(%)=(Inlet NOx concentration−outlet NOx concentration)/(Inlet NOx concentration)×100

TABLE 4

Composition of reactive gas

| Gas composition | Stoichiometric ratio |
|---|---|
| Z (−) | 1.000 |
| A/F (−) | 14.5 |
| NO (ppm) | 1000 |
| CO (%) | 0.6 |
| $H_2$ (%) | 0.2 |
| $O_2$ (%) | 0.6 |
| $CO_2$ (%) | 13.9 |
| HC (ppmC) | 1665 |
| $H_2O$ (%) | 10 |
| $H_2$ (Balance) | Balance |

Gas flowrate: 40 L/min

TABLE 5

|  | ηNOx |
|---|---|
| Example 1 | 80 |
| Example 2 | 82 |
| Example 3 | 87 |
| Example 4 | 85 |
| Example 5 | 88 |
| Example 6 | 83 |
| Example 7 | 85 |
| Example 8 | 86 |
| Example 9 | 86 |
| Example 10 | 86 |
| Comparative example 1 | 60 |
| Comparative example 2 | 56 |

Table 5 shows that the catalyst of each of the examples brings about an effect of suppressing the noble metal deterioration, thus also improving the catalytic activation. Moreover, noble metals other than Pt, such as Pd (example 7) and Rh (example 8) can bring about the same effect.

Moreover, the base metal (examples 2, 3, 4, 5 and 7) coexisting with the noble metal further improves the catalytic activation.

Example 11

A cerium zirconium compound oxide particle having an average particle diameter of 30 nm was used as a first compound. Dinitrodiamine Pt was impregnated to this particle, to thereby prepare a cerium zirconium compound oxide particle (hereinafter referred to as "cerium zirconium compound oxide particle A") carrying thereon Pt 0.85%. 118.42 g of needle boehmite (10 mm×100 μm) containing moisture by 24% was inputted to a beaker, followed by dispersion in water and peptization by acid. Then, 90 g of the cerium zirconium compound oxide particle A prepared in advance was added to the thus obtained, followed by dispersion through a high speed stirring. Then, this slurry was dried and fired, to thereby prepare a powder a-1 including the cerium zirconium compound oxide particle A coated with alumina.

168 g of this powder a-1, 7 g of boehmite alumina and 9.21 g of an active carbon powder were added to a ball mill. Then, 307.5 g of water and 17.5 g of 10% nitric acid aqueous solution were added to the ball mill, followed by shattering of the powder a-1, to thereby prepare a slurry having an average particle diameter of 3 μm (slurry a-1).

Then, rhodium nitrate was impregnated to a zirconium lanthanum compound oxide particle having an average particle diameter of 20 nm, to thereby prepare a particle B carrying thereon rhodium 0.814%. 118.42 g of needle boehmite containing moisture by 24% was inputted to a beaker, followed by dispersion in water and peptization by acid. Then, 90 g of the particle B prepared in advance was added to the thus obtained, followed by dispersion through a high speed stirring. Then, this slurry was dried and fired, to thereby prepare a powder b-1 including the particle B coated with alumina.

168 g of this powder b-1, 7 g of boehmite alumina and 9.21 g of an active carbon powder were added to a ball mill. Then, 307.5 g of water and 17.5 g of 10% nitric acid aqueous solution were added to the ball mill, followed by shattering of the powder b-1, to thereby prepare a slurry having an average particle diameter of 3 μm (slurry b-1).

The slurry a-1 was coated on a honeycomb carrier (capacity 0.04 L) having a diameter of 36 mmϕ, 400 cell, 6 mil, followed by drying and firing, to thereby prepare a catalyst layer having 140 g/L coating. Then, the thus prepared catalyst layer was coated with the slurry b-1, followed by drying and firing, to thereby prepare a catalyst layer having 60 g/L coating. This catalyst layer was prepared for a sample of the example 11. The thus obtained sample of the example 11 is a catalyst carrying thereon 0.5712 g/L of Pt and 0.2344 g/L of Rh.

Example 12

A cerium zirconium compound oxide particle having an average particle diameter of 30 nm was used as a first compound. Dinitrodiamine Pt was impregnated to this particle, to thereby prepare a cerium zirconium compound oxide particle (hereinafter referred to as "cerium zirconium compound oxide particle A") carrying thereon Pt 0.85%.

118.42 g of needle boehmite (10 nmϕ×100 nm) containing moisture by 24% was inputted to a beaker, followed by dispersion in water and peptization by acid. Then, 90 g of the cerium zirconium compound oxide particle A prepared in advance was added to the thus obtained, followed by dispersion through a high speed stirring. Then, this slurry was dried and fired, to thereby prepare a powder a-1 including the cerium zirconium compound oxide particle A coated with alumina.

168 g of this powder a-1, 7 g of boehmite alumina and 19.44 g of an active carbon powder were added to a ball mill. Then, 307.5 g of water and 17.5 g of 10% nitric acid aqueous solution were added to the ball mill, followed by shattering of the powder a-1, to thereby prepare a slurry having an average particle diameter of 3 μm (slurry a-2).

Then, rhodium nitrate was impregnated to a zirconium lanthanum compound oxide particle having an average particle diameter of 20 nm, to thereby prepare a particle B carrying thereon rhodium 0.814%. 118.42 g of needle boehmite containing moisture by 24% was inputted to a beaker, followed by dispersion in water and peptization by acid. Then, 90 g of the particle B prepared in advance was added to the thus obtained, followed by dispersion through a high speed stirring. Then, this slurry was dried and fired, to thereby prepare a powder b-1 including the particle B coated with alumina.

168 g of this powder b-1, 7 g of boehmite alumina and 19.44 g of an active carbon powder were added to the ball mill. Then, 307.5 g of water and 17.5 g of 10% nitric acid aqueous solution were added to a ball mill, followed by shattering of the powder b-1, to thereby prepare a slurry having an average particle diameter of 3 μm (slurry b-2).

The slurry a-2 was coated on a honeycomb carrier (capacity 0.04 L) having a diameter of 36 mmφ, 400 cell, 6 mil, followed by drying and firing, to thereby prepare a catalyst layer having. 140 g/L coating. Then, the thus prepared catalyst layer was coated with the slurry b-2, followed by drying and firing, to thereby prepare a catalyst layer having 60 g/L coating. This catalyst layer was prepared for a sample of the example 12. The thus obtained sample of the example 12 is a catalyst carrying thereon 0.5712 g/L of Pt and 0.2344 g/L of Rh.

Example 13

A cerium zirconium compound oxide particle having an average particle diameter of 30 nm was used as a first compound. Dinitrodiamine Pt was impregnated to this particle, to thereby prepare a cerium zirconium compound oxide particle (hereinafter referred to as "cerium zirconium compound oxide particle A") carrying thereon Pt 0.85%.

118.42 g of needle boehmite (10 nmφ×100 nm) containing moisture by 24% was inputted to a beaker, followed by dispersion in water and peptization by acid. Then, 90 g of the cerium zirconium compound oxide particle A prepared in advance was added to the thus obtained, followed by dispersion through a high speed stirring. Then, this slurry was dried and fired, to thereby prepare a powder a-1 including the cerium zirconium compound oxide particle A coated with alumina.

168 g of this powder a-1, 7 g of boehmite alumina and 33.33 g of an active carbon powder were added to a ball mill. Then, 307.5 g of water and 17.5 g of 10% nitric acid aqueous solution were added to the ball mill, followed by shattering of the powder a-1, to thereby prepare a slurry having an average particle diameter of 3 μm (slurry a-3).

Then, rhodium nitrate was impregnated to a zirconium lanthanum compound oxide particle having an average particle diameter of 20 nm, to thereby prepare a particle B carrying thereon rhodium 0.814%. 118.42 g of needle boehmite containing moisture by 24% was inputted to a beaker, followed by dispersion in water and peptization by acid. Then, 90 g of the particle B prepared in advance was added to the thus obtained, followed by dispersion through a high speed stirring. Then, this slurry was dried and fired, to thereby prepare a powder b-1 including the particle B coated with alumina.

168 g of this powder b-1, 7 g of boehmite alumina and 33.33 g of an active carbon powder were added to a ball mill.

Then, 307.5 g of water and 17.5 g of 10% nitric acid aqueous solution were added to the ball mill, followed by shattering of the powder b-1, to thereby prepare a slurry having an average particle diameter of 3 μm (slurry b-3).

The slurry a-3 was coated on a honeycomb carrier (capacity 0.04 L) having a diameter of 36 mmφ, 400 cell, 6 mil, followed by drying and firing, to thereby prepare a catalyst layer having 140 g/L coating. Then, the thus prepared catalyst layer was coated with the slurry b-3, followed by drying and firing, to thereby prepare a catalyst layer having 60 g/L coating. This catalyst layer was prepared for a sample of the example 13. The thus obtained sample of the example 13 is a catalyst carrying thereon 0.5712 g/L of Pt and 0.2344 g/L of Rh.

Example 14

A cerium zirconium compound oxide particle having an average particle diameter of 30 nm was used as a first compound. Dinitrodiamine Pt was impregnated to this particle, to thereby prepare a cerium zirconium compound oxide particle (hereinafter referred to as "cerium zirconium compound oxide particle A") carrying thereon Pt 0.85%.

118.42 g of needle boehmite (10 nmφ×100 nm) containing moisture by 24% was inputted to a beaker, followed by dispersion in water and peptization by acid. Then, 90 g of the cerium zirconium compound oxide particle A prepared in advance was added to the thus obtained, followed by dispersion through a high speed stirring. Then, this slurry was dried and fired, to thereby prepare a powder a-1 including the cerium zirconium compound oxide particle A coated with alumina.

168 g of this powder a-1, 7 g of boehmite alumina and 46.51 g of an active carbon powder were added to a ball mill. Then, 307.5 g of water and 17.5 g of 10% nitric acid aqueous solution were added to the ball mill, followed by shattering of the powder b-1, to thereby prepare a slurry having an average particle diameter of 3 μm (slurry a-4).

Then, rhodium nitrate was impregnated to a zirconium lanthanum compound oxide particle having an average particle diameter of 20 nm, to thereby prepare a particle B carrying thereon rhodium 0.814%. 118.42 g of needle boehmite containing moisture by 24% was inputted to a beaker, followed by dispersion in water and peptization by acid. Then, 90 g of the particle B prepared in advance was added to the thus obtained, followed by dispersion through a high speed stirring. Then, this slurry was dried and fired, to thereby prepare a powder b-1 including the particle B coated with alumina.

168 g of this powder b-1, 7 g of boehmite alumina and 46.51 g of an active carbon powder were added to a ball mill. Then, 307.5 g of water and 17.5 g of 10% nitric acid aqueous solution were added to the ball mill, followed by shattering of the powder b-1, to thereby prepare a slurry having an average particle diameter of 3 μm (slurry b-4).

The slurry a-4 was coated on a honeycomb carrier (capacity 0.04 L) having a diameter of 36 mmφ, 400 cell, 6 mil, followed by drying and firing, to thereby prepare a catalyst layer having 140 g/L coating. Then, the thus prepared catalyst layer was coated with the slurry b-4, followed by drying and firing, to thereby prepare a catalyst layer having 60 g/L coating. This catalyst layer was prepared for a sample of the example 14. The thus obtained sample of the example 14 is a catalyst carrying thereon 0.5712 g/L of Pt and 0.2344 g/L of Rh.

Example 15

A cerium zirconium compound oxide particle having an average particle diameter of 30 nm was used as a first compound. Dinitrodiamine Pt was impregnated to this particle, to thereby prepare a cerium zirconium compound oxide particle (hereinafter referred to as "cerium zirconium compound oxide particle A") carrying thereon Pt 0.85%.

118.42 g of needle boehmite (10 mm×100 nm) containing moisture by 24% was inputted to a beaker, followed by dispersion in water and peptization by acid. Then, 90 g of the cerium zirconium compound oxide particle A prepared in advance was added to the thus obtained, followed by dispersion through a high speed stirring. Then, this slurry was dried and fired, to thereby prepare a powder a-1 including the cerium zirconium compound oxide particle A coated with alumina.

168 g of this powder a-1, 7 g of boehmite alumina and 61.48 g of an active carbon powder were added to a ball mill. Then, 307.5 g of water and 17.5 g of 10% nitric acid aqueous solution were added to the ball mill, followed by shattering of the powder a-1, to thereby prepare a slurry having an average particle diameter of 3 μm (slurry a-5).

Then, rhodium nitrate was impregnated to a zirconium lanthanum compound oxide particle having an average particle diameter of 20 nm, to thereby prepare a particle B carrying thereon rhodium 0.814%. 118.42 g of needle boehmite containing moisture by 24% was inputted to a beaker, followed by dispersion in water and peptization by acid. Then, 90 g of the particle B prepared in advance was added to the thus obtained, followed by dispersion through a high speed stirring. Then, this slurry was dried and fired, to thereby prepare a powder b-1 including the particle B coated with alumina.

168 g of this powder b-1, 7 g of boehmite alumina and 61.48 g of an active carbon powder were added to a ball mill. Then, 307.5 g of water and 17.5 g of 10% nitric acid aqueous solution were added to the ball mill, followed by shattering of the powder b-1, to thereby prepare a slurry having an average particle diameter of 3 μm (slurry b-5).

The slurry a-5 was coated on a honeycomb carrier (capacity 0.04 L) having a diameter of 36 mmϕ, 400 cell, 6 mil, followed by drying and firing, to thereby prepare a catalyst layer having 140 g/L coating. Then, the thus prepared catalyst layer was coated with the slurry b-5, followed by drying and firing, to thereby prepare a catalyst layer having 60 g/L coating. This catalyst layer was prepared for a sample of the example 15. The thus obtained sample of the example 15 is a catalyst carrying thereon 0.5712 g/L of Pt and 0.2344 g/L of Rh.

Example 16

A cerium zirconium compound oxide particle having an average particle diameter of 30 nm was used as a first compound. Dinitrodiamine Pt was impregnated to this particle, to thereby prepare a cerium zirconium compound oxide particle (hereinafter referred to as "cerium zirconium compound oxide particle A") carrying thereon Pt 0.85%.

118.42 g of needle boehmite (10 nmϕ×100 nm) containing moisture by 24% was inputted to a beaker, followed by dispersion in water and peptization by acid. Then, 90 g of the cerium zirconium compound oxide particle A prepared in advance was added to the thus obtained, followed by dispersion through a high speed stirring. Then, this slurry was dried and fired, to thereby prepare a powder a-1 including the cerium zirconium compound oxide particle A coated with alumina.

168 g of this powder a-1, 7 g of boehmite alumina and 75 g of an active carbon powder were added to a ball mill. Then, 307.5 g of water and 17.5 g of 10% nitric acid aqueous solution were added to the ball mill, followed by shattering of the powder a-1, to thereby prepare a slurry having an average particle diameter of 3 μm (slurry a-6).

Then, rhodium nitrate was impregnated to a zirconium lanthanum compound oxide particle having an average particle diameter of 20 nm, to thereby prepare a particle B carrying thereon rhodium 0.814%. 118.42 g of needle boehmite containing moisture by 24% was inputted to a beaker, followed by dispersion in water and peptization by acid. Then, 90 g of the particle B prepared in advance was added to the thus obtained, followed by dispersion through a high speed stirring. Then, this slurry was dried and fired, to thereby prepare a powder b-1 including the particle B coated with alumina.

168 g of this powder b-1, 7 g of boehmite alumina and 75 g of an active carbon powder were added to a ball mill. Then, 307.5 g of water and 17.5 g of 10% nitric acid aqueous solution were added to the ball mill, followed by shattering of the powder b-1, to thereby prepare a slurry having an average particle diameter of 3 μm (slurry b-6).

The slurry a-6 was coated on a honeycomb carrier (capacity 0.04 L) having a diameter of 36 mmϕ, 400 cell, 6 mil, followed by drying and firing, to thereby prepare a catalyst layer having 140 g/L coating. Then, the thus prepared catalyst layer was coated with the slurry b-6, followed by drying and firing, to thereby prepare a catalyst layer having 60 g/L coating. This catalyst layer was prepared for a sample of the example 16. The thus obtained sample of the example 16 is a catalyst carrying thereon 0.5712 g/L of Pt and 0.2344 g/L of Rh.

Example 17

A cerium zirconium compound oxide particle having an average particle diameter of 30 nm was used as a first compound. Dinitrodiamine Pd was impregnated to this particle, to thereby prepare a cerium zirconium compound oxide particle (hereinafter referred to as "cerium zirconium compound oxide particle A2") carrying thereon Pd 0.85%.

118.42 g of needle boehmite (10 nmϕ×100 nm) containing moisture by 24% was inputted to a beaker, followed by dispersion in water and peptization by acid. Then, 90 g of the cerium zirconium compound oxide particle A2 prepared in advance was added to the thus obtained, followed by dispersion through a high speed stirring. Then, this slurry was dried and fired, to thereby prepare a powder a-2 including the cerium zirconium compound oxide particle A2 coated with alumina.

168 g of this powder a-2, 7 g of boehmite alumina and 33.3 g of an active carbon powder were added to a ball mill. Then, 307.5 g of water and 17.5 g of 10% nitric acid aqueous solution were added to the ball mill, followed by shattering of the powder a-2, to thereby prepare a slurry having an average particle diameter of 3 μm (slurry a-6).

Then, rhodium nitrate was impregnated to a zirconium lanthanum compound oxide particle having an average particle diameter of 20 μm, to thereby prepare a particle B carrying thereon rhodium 0.814%. 118.42 g of needle boehmite containing moisture by 24% was inputted to a beaker, followed by dispersion in water and peptization by acid. Then, 90 g of the particle B prepared in advance was added to the thus obtained, followed by dispersion through a high speed stirring. Then, this slurry was dried and fired, to thereby prepare a powder b-1 including the particle B coated with alumina.

168 g of this powder b-1, 7 g of boehmite alumina and 33.3 g of an active carbon powder were added to a ball mill. Then, 307.5 g of water and 17.5 g of 10% nitric acid aqueous solution were added to the ball mill, followed by shattering of the powder b-1, to thereby prepare a slurry having an average particle diameter of 3 μm (slurry b-7).

The slurry a-7 was coated on a honeycomb carrier (capacity 0.04 L) having a diameter of 36 mmϕ, 400 cell, 6 mil, followed by drying and firing, to thereby prepare a catalyst layer having 140 g/L coating. Then, the thus prepared catalyst layer was coated with the slurry b-7, followed by drying and firing, to thereby prepare a catalyst layer having 60 g/L coating. This catalyst layer was prepared for a sample of the example 17. The thus obtained sample of the example 17 is a catalyst carrying thereon 0.5712 g/L of Pt and 0.2344 g/L of Rh.

Example 18

A cerium zirconium compound oxide particle having an average particle diameter of 30 nm was used as a first compound. Dinitrodiamine Pd was impregnated to this particle, to thereby prepare a cerium zirconium compound oxide particle (hereinafter referred to as "cerium zirconium compound oxide particle A2") carrying thereon Pd by 0.85%.

118.42 g of needle boehmite (10 nm$\phi$×100 nm) containing moisture by 24% was inputted to a beaker, followed by dispersion in water and peptization by acid. Then, 90 g of the cerium zirconium compound oxide particle A2 prepared in advance was added to the thus obtained, followed by dispersion through a high speed stirring. Then, this slurry was dried and fired, to thereby prepare a powder a-2 including the cerium zirconium compound oxide particle A2 coated with alumina.

168 g of this powder a-2, 7 g of boehmite alumina and 46.51 g of an active carbon powder were added to a ball mill. Then, 307.5 g of water and 17.5 g of 10% nitric acid aqueous solution were added to the ball mill, followed by shattering of the powder a-2, to thereby prepare a slurry having an average particle diameter of 3 μm (slurry a-8).

Then, rhodium nitrate was impregnated to a zirconium lanthanum compound oxide particle having an average particle diameter of 20 nm, to thereby prepare a particle B carrying thereon rhodium 0.814%. 118.42 g of needle boehmite containing moisture by 24% was inputted to a beaker, followed by dispersion in water and peptization by acid. Then, 90 g of the particle B prepared in advance was added to the thus obtained, followed by dispersion through a high speed stirring. Then, this slurry was dried and fired, to thereby prepare a powder b-1 including the particle B coated with alumina.

168 g of this powder b-1, 7 g of boehmite alumina and 46.51 g of an active carbon powder were added to the ball mill. Then, 307.5 g of water and 17.5 g of 10% nitric acid aqueous solution were added to the ball mill, followed by shattering of the powder b-1, to thereby prepare a slurry having an average particle diameter of 3 μm (slurry b-8).

The slurry a-8 was coated on a honeycomb carrier (capacity 0.04 L) having a diameter of 36 mm$\phi$, 400 cell, 6 mil, followed by drying and firing, to thereby prepare a catalyst layer having 140 g/L coating. Then, the thus prepared catalyst layer was coated with the slurry b-8, followed by drying and firing, to thereby prepare a catalyst layer having 60 g/L coating. This catalyst layer was prepared for a sample of the example 18. The thus obtained sample of the example 18 is a catalyst carrying thereon 0.5712 g/L of Pt and 0.2344 g/L of Rh.

Comparative Example 3

A cerium zirconium compound oxide particle having an average particle diameter of 30 nm was used as a first compound. Dinitrodiamine Pt was impregnated to this cerium zirconium compound oxide particle, to thereby prepare a cerium zirconium compound oxide particle (hereinafter referred to as "cerium zirconium compound oxide particle A") carrying thereon Pt 0.85%.

About 90 g of aluminum isopropoxide as $Al_2O_3$ was dissolved in 2-methyl 2, 4 pentane diol, then added by 90 g of the cerium zirconium compound oxide particle A, and then added by water, thus implementing a hydrolysis. The water and an organic compound such as 2-methyl 2, 4 pentane diol and the like were evaporated and dried, followed by firing, to thereby prepare a powder a-3 including the particle A coated with alumina. The alumina has a particle diameter of 7 nm to 8 nm.

168 g of this powder a-3 and 7 g of boehmite alumina were added to a ball mill. Then, 307.5 g of water and 17.5 g of 10% nitric acid aqueous solution were added to the ball mill, followed by shattering of the powder a-3, to thereby prepare a slurry having an average particle diameter of 3 μm (slurry a-9).

Then, rhodium nitrate was impregnated to a zirconium lanthanum compound oxide particle having an average particle diameter of 20 nm, to thereby prepare a particle B carrying thereon rhodium 0.814%. About 90 g of aluminum isopropoxide as $Al_2O_3$ was dissolved in 2-methyl 2, 4 pentane diol, then added by 90 g of the particle B, and then added by water, thus implementing a hydrolysis. The water and an organic compound such as 2-methyl 2, 4 pentane diol and the like were evaporated and dried, followed by firing, to thereby prepare a powder b-2 including the particle B coated with alumina.

168 g of this powder b-2 and 7 g of boehmite alumina were added to a ball mill. Then, 307.5 g of water and 17.5 g of 10% nitric acid aqueous solution were added to the ball mill, followed by shattering of the powder b-2, to thereby prepare a slurry having an average particle diameter of 3 μm (slurry b-9).

140 g/L of the slurry a-9 was coated on a honeycomb carrier (capacity 0.04 L) having a diameter of 36 mm$\phi$, 400 cell, 6 mil, followed by drying. Then, 60 g/L of the slurry a-9 was coated and dried, followed by firing at 400° C., to thereby prepare a sample of the comparative example 3. The thus prepared sample of the comparative example 3 is a catalyst carrying thereon 0.5712 g/L of Pt and 0.2344 g/L of Rh.

Comparative Example 4

A cerium zirconium compound oxide particle having an average particle diameter of 30 nm was used as a first compound. Dinitrodiamine Pt was impregnated to this cerium zirconium compound oxide particle, to thereby prepare a cerium zirconium compound oxide particle (hereinafter referred to as "cerium zirconium compound oxide particle A") carrying thereon Pt 0.85%.

About 90 g of aluminum isopropoxide as $Al_2O_3$ was dissolved in 2-methyl 2, 4 pentane diol, then added by 90 g of the cerium zirconium compound oxide particle A, and then added by water, thus implementing a hydrolysis. The water and an organic compound such as 2-methyl 2, 4 pentane diol and the like were evaporated and dried, followed by firing, to thereby prepare a powder a-3 including the particle A coated with alumina. The alumina has a particle diameter of 7 nm to 8 nm.

168 g of this powder a-3 and 7 g of boehmite alumina and 94.23 g of an active carbon powder were added to a ball mill. Then, 307.5 g of water and 17.5 g of 10% nitric acid aqueous solution were added to the ball mill, followed by shattering of the powder a-3, to thereby prepare a slurry having an average particle diameter of 3 μm (slurry a-10).

Then, rhodium nitrate was impregnated to a zirconium lanthanum compound oxide particle having an average particle diameter of 20 nm, to thereby prepare a particle B carrying thereon rhodium 0.814%. About 90 g of aluminum isopropoxide as $Al_2O_3$ was dissolved in 2-methyl 2, 4 pentane diol, then added by 90 g of the particle B, and then added by water, thus implementing a hydrolysis. The water and an organic compound such as 2-methyl 2,4 pentane diol and the like were evaporated and dried, followed by firing, to thereby prepare a powder b-2 including the particle B coated with alumina.

168 g of this powder b-2, 7 g of boehmite alumina and 94.23 g of an active carbon powder were added to a ball mill. Then, 307.5 g of water and 17.5 g of 10% nitric acid aqueous solution were added to the ball mill, followed by shattering of the powder b-2, to thereby prepare a slurry having an average particle diameter of 3 μm (slurry b-10).

The slurry a-10 was coated on a honeycomb carrier (capacity 0.04 L) having a diameter of 36 mmφ, 400 cell, 6 mil, followed by drying and firing, to thereby prepare a catalyst layer having 140 g/L coating. Then, the slurry b-10 was coated on the thus obtained catalyst layer, followed by drying and firing, to thereby prepare a catalyst layer having 60 g/L coating. The thus prepared catalyst layer was used as a sample of the comparative example 4. The thus prepared sample of the comparative example 4 is a catalyst carrying thereon 0.5712 g/L of Pt and 0.2344 g/L of Rh.

The following table 6 shows specifications of the thus obtained catalyst of each of the examples and comparative examples, and the P calculated according the expression (A).

168 g of this powder a-11, 7 g of boehmite alumina and 52.27 g of an active carbon powder were added to a ball mill. Then, 307.5 g of water and 17.5 g of 10% nitric acid aqueous solution were added to the ball mill, followed by shattering of the powder a-11, to thereby prepare a slurry having an average particle diameter of 3 μm (slurry a-19).

Then, rhodium nitrate was impregnated to a zirconium lanthanum compound oxide particle including zirconium 90% and lanthanum 10%, to thereby prepare a particle B2 carrying thereon rhodium 0.814%. 105.88 g of cubic boehmite (20 nm×20 nm×20 nm) containing moisture by 15% was inputted to a beaker, followed by dispersion in water and peptization by acid. Then, 90 g of the particle B prepared in advance was added to the thus obtained, followed by dispersion through a high speed stirring. Then, this slurry was dried and fired, to thereby prepare a powder b-8 including the particle B coated with alumina.

168 g of this powder b-8, 7 g of boehmite alumina and 52.27 g of an active carbon powder were added to a ball mill. Then, 307.5 g of water and 17.5 g of 10% nitric acid aqueous solution were added to the ball mill, followed by shattering of the powder b-8, to thereby prepare a slurry having an average particle diameter of 3 μm (slurry b-17).

The slurry a-19 was coated on a honeycomb carrier (capacity 0.04 L) having a diameter of 36 mmφ, 400 cell, 6 mil, followed by drying and firing, to thereby prepare a catalyst layer having 140 g/L coating. Then, the thus prepared catalyst

TABLE 6

| Examples and comparative examples | Noble metal | Carrier concentration (%) | Promoter component C | Main component of carrier substrate | Noble metal | Carrier concentration (%) | Promoter component C | Main component of carrier substrate | P |
|---|---|---|---|---|---|---|---|---|---|
| Example 11 | Pt | 0.85 | CeZr compound oxide | $Al_2O_3$ | Rh | 0.814 | ZrLa compound oxide | $Al_2O_3$ | 0.08 |
| Example 12 | Pt | 0.85 | CeZr compound oxide | $Al_2O_3$ | Rh | 0.814 | ZrLa compound oxide | $Al_2O_3$ | 0.16 |
| Example 13 | Pt | 0.85 | CeZr compound oxide | $Al_2O_3$ | Rh | 0.814 | ZrLa compound oxide | $Al_2O_3$ | 0.25 |
| Example 14 | Pt | 0.85 | CeZr compound oxide | $Al_2O_3$ | Rh | 0.814 | ZrLa compound oxide | $Al_2O_3$ | 0.32 |
| Example 15 | Pt | 0.85 | CeZr compound oxide | $Al_2O_3$ | Rh | 0.814 | ZrLa compound oxide | $Al_2O_3$ | 0.40 |
| Example 16 | Pt | 0.85 | CeZr compound oxide | $Al_2O_3$ | Rh | 0.814 | ZrLa compound oxide | $Al_2O_3$ | 0.47 |
| Example 17 | Pd | 0.85 | CeZr compound oxide | $Al_2O_3$ | Rh | 0.814 | ZrLa compound oxide | $Al_2O_3$ | 0.24 |
| Example 18 | Pd | 0.85 | CeZr compound oxide | $Al_2O_3$ | Rh | 0.814 | ZrLa compound oxide | $Al_2O_3$ | 0.32 |
| Comparative example 3 | Pt | 0.85 | CeZr compound oxide | $Al_2O_3$ | Rh | 0.814 | ZrLa compound oxide | $Al_2O_3$ | 0.07 |
| Comparative example 4 | Pt | 0.85 | CeZr compound oxide | $Al_2O_3$ | Rh | 0.814 | ZrLa compound oxide | $Al_2O_3$ | 0.51 |

Example 19

A cerium zirconium compound oxide particle including cerium 70% and zirconium 30% was used as a first compound. Dinitrodiamine Pt was impregnated to this particle, to thereby prepare a cerium zirconium compound oxide particle (hereinafter referred to as "particle A3") carrying thereon Pt 0.85%.

105.88 g of cubic boehmite (20 nm×20 nm×20 nm) containing moisture by 15% was inputted to a beaker, followed by dispersion in water and peptization by acid. Then, 90 g of the particle A3 prepared in advance was added to the thus obtained, followed by dispersion through a high speed stirring. Then, this slurry was dried and fired, to thereby prepare a powder a-11 including the particle A coated with alumina.

layer was coated with the slurry b-17, followed by drying and firing, to thereby prepare a catalyst layer having 60 g/L coating. This catalyst layer was prepared for a sample of the example 19. The thus obtained sample of the example 19 is a catalyst carrying thereon 0.5712 g/L of Pt and 0.2344 g/L of Rh.

Example 20

A cerium zirconium compound oxide particle including cerium 78% and zirconium 22% was used as a first compound. Dinitrodiamine Pt was impregnated to this particle, to thereby prepare a cerium zirconium compound oxide particle (hereinafter referred to as "particle A4") carrying thereon Pt 0.85%.

105.88 g of cubic boehmite (20 nm×20 nm×20 nm) containing moisture by 15% was inputted to a beaker, followed by dispersion in water and peptization by acid. Then, 90 g of the particle A4 prepared in advance was added to the thus obtained, followed by dispersion through a high speed stirring. Then, this slurry was dried and fired, to thereby prepare a powder a-12 including the particle A4 coated with alumina.

168 g of this powder a-12, 7 g of boehmite alumina and 52.27 g of an active carbon powder were added to a ball mill. Then, 307.5 g of water and 17.5 g of 10% nitric acid aqueous solution were added to the ball mill, followed by shattering of the powder a-12, to thereby prepare a slurry having an average particle diameter of 3 μm (slurry a-20).

Then, rhodium nitrate was impregnated to a zirconium lanthanum compound oxide particle including zirconium 95% and lanthanum 5%, to thereby prepare a particle B3 carrying thereon rhodium 0.814%. 105.88 g of cubic boehmite (20 nm×20 nm×20 nm) containing moisture by 15% was inputted to a beaker, followed by dispersion in water and peptization by acid. Then, 90 g of the particle B3 prepared in advance was added to the thus obtained, followed by dispersion through a high speed stirring. Then, this slurry was dried and fired, to thereby prepare a powder b-9 including the particle B3 coated with alumina.

168 g of this powder b-9, 7 g of boehmite alumina and 52.27 g of an active carbon powder were added to a ball mill. Then, 307.5 g of water and 17.5 g of 10% nitric acid aqueous solution were added to the ball mill, followed by shattering of the powder b-9, to thereby prepare a slurry having an average particle diameter of 3 μm (slurry b-18).

The slurry a-20 was coated on a honeycomb carrier (capacity 0.04 L) having a diameter of 36 mmφ, 400 cell, 6 mil, followed by drying and firing, to thereby prepare a catalyst layer having 140 g/L coating. Then, the thus prepared catalyst layer was coated with the slurry b-18, followed by drying and firing, to thereby prepare a catalyst layer having 60 g/L coating. This catalyst layer was prepared for a sample of the example 20. The thus obtained sample of the example 20 is a catalyst carrying thereon 0.5712 g/L of Pt and 0.2344 g/L of Rh.

Example 21

A cerium zirconium compound oxide particle including cerium 85% and zirconium 15% was used as a first compound. Dinitrodiamine Pt was impregnated to this particle, to thereby prepare a cerium zirconium compound oxide particle (hereinafter referred to as "particle A5") carrying thereon Pt 0.85%.

105.88 g of cubic boehmite (20 nm×20 nm×20 nm) containing moisture by 15% was inputted to a beaker, followed by dispersion in water and peptization by acid. Then, 90 g of the particle A5 prepared in advance was added to the thus obtained, followed by dispersion through a high speed stirring. Then, this slurry was dried and fired, to thereby prepare a powder a-13 including the particle A5 coated with alumina.

168 g of this powder a-13, 7 g of boehmite alumina and 52.27 g of an active carbon powder were added to a ball mill. Then, 307.5 g of water and 17.5 g of 10% nitric acid aqueous solution were added to the ball mill, followed by shattering of the powder a-13, to thereby prepare a slurry having an average particle diameter of 3 μm (slurry a-21).

Then, rhodium nitrate was impregnated to a zirconium lanthanum compound oxide particle including zirconium 99% and lanthanum 1%, to thereby prepare a particle B4 carrying thereon rhodium 0.814%. 105.88 g of cubic boehmite (20 nm×20 nm×20 nm) containing moisture by 15% was inputted to a beaker, followed by dispersion in water and peptization by acid. Then, 90 g of the particle B4 prepared in advance was added to the thus obtained, followed by dispersion through a high speed stirring. Then, this slurry was dried and fired, to thereby prepare a powder b-10 including the particle B4 coated with alumina.

168 g of this powder b-10, 7 g of boehmite alumina and 52.27 g of an active carbon powder were added to a ball mill. Then, 307.5 g of water and 17.5 g of 10% nitric acid aqueous solution were added to the ball mill, followed by shattering of the powder b-10, to thereby prepare a slurry having an average particle diameter of 3 μm (slurry b-19).

The slurry a-21 was coated on a honeycomb carrier (capacity 0.04 L) having a diameter of 36 mmφ, 400 cell, 6 mil, followed by drying and firing, to thereby prepare a catalyst layer having 140 g/L coating. Then, the thus prepared catalyst layer was coated with the slurry b-19, followed by drying and firing, to thereby prepare a catalyst layer having 60 g/L coating. This catalyst layer was prepared for a sample of the example 21. The thus obtained sample of the example 21 is a catalyst carrying thereon 0.5712 g/L of Pt and 0.2344 g/L of Rh.

Comparative Example 5

A cerium zirconium compound oxide particle including cerium 60% and zirconium 40% was used as a first compound. Dinitrodiamine Pt was impregnated to this particle, to thereby prepare a cerium zirconium compound oxide particle (hereinafter referred to as "particle A6") carrying thereon Pt 0.85%.

About 90 g of aluminum isopropoxide as $Al_2O_3$ was dissolved in 2-methyl 2, 4 pentane diol, then added by 90 g of the particle A6, and then added by water, thus implementing a hydrolysis. The water and an organic compound such as 2-methyl 2, 4 pentane diol and the like were evaporated and dried, followed by firing, to thereby prepare a powder a-14 including the particle A6 coated with alumina.

168 g of this powder a-14 and 7 g of boehmite alumina were added to a ball mill. Then, 307.5 g of water and 17.5 g of 10% nitric acid aqueous solution were added to the ball mill, followed by shattering of the powder a-14, to thereby prepare a slurry having an average particle diameter of 3 μm (slurry a-22).

Then, rhodium nitrate was impregnated to a zirconium lanthanum compound oxide particle having zirconium 80% and lanthanum 20%, to thereby prepare a particle B5 carrying thereon rhodium 0.814%.

About 90 g of aluminum isopropoxide as $Al_2O_3$ was dissolved in 2-methyl 2, 4 pentane diol, then added by 90 g of the particle B5, and then added by water, thus implementing a hydrolysis. The water and an organic compound such as 2-methyl 2, 4 pentane diol and the like were evaporated and dried, followed by firing, to thereby prepare a powder b-11 including the particle B5 coated with alumina.

168 g of this powder b-11 and 7 g of boehmite alumina were added to a ball mill. Then, 307.5 g of water and 17.5 g of 10% nitric acid aqueous solution were added to the ball mill, followed by shattering of the powder b-11, to thereby prepare a slurry having an average particle diameter of 3 μm (slurry b-20).

The slurry a-22 was coated on a honeycomb carrier (capacity 0.04 L) having a diameter of 36 mmφ, 400 cell, 6 mil, followed by drying and firing, to thereby prepare 140 g/L of a catalyst layer. Then, the slurry b-20 was coated on the thus prepared catalyst layer, followed by drying and firing, to thereby prepare 60 g/L of a catalyst layer. This catalyst layer was prepared for a sample of the comparative example 5. The thus prepared sample of the comparative example 5 is a catalyst carrying thereon 0.5712 g/L of Pt and 0.2344 g/L of Rh.

Comparative Example 6

A cerium zirconium compound oxide particle including cerium 90% and zirconium 10% was used as a first compound. Dinitrodiamine Pt was impregnated to this particle, to thereby prepare a cerium zirconium compound oxide particle (hereinafter referred to as "particle A7") carrying thereon Pt 0.85%.

About 90 g of aluminum isopropoxide as $Al_2O_3$ was dissolved in 2-methyl 2, 4 pentane diol, then added by 90 g of the particle A7, and then added by water, thus implementing a hydrolysis. The water and an organic compound such as 2-methyl 2, 4 pentane diol and the like were evaporated and dried, followed by firing, to thereby prepare a powder a-15 including the particle A7 coated with alumina.

168 g of this powder a-15 and 7 g of boehmite alumina were added to a ball mill. Then, 307.5 g of water and 17.5 g of 10% nitric acid aqueous solution were added to the ball mill, followed by shattering of the powder a-15, to thereby prepare a slurry having an average particle diameter of 3 μm (slurry a-23).

Then, rhodium nitrate was impregnated to a particle having zirconium 100%, to thereby prepare a particle B6 carrying thereon rhodium 0.814%. About 90 g of aluminum isopropoxide as $Al_2O_3$ was dissolved in 2-methyl 2, 4 pentane diol, then added by 90 g of the particle B6, and then added by water, thus implementing a hydrolysis. The water and an organic compound such as 2-methyl 2, 4 pentane diol and the like were evaporated and dried, followed by firing, to thereby prepare a powder b-12 including the particle B6 coated with alumina.

168 g of this powder b-12 and 7 g of boehmite alumina were added to a ball mill. Then, 307.5 g of water and 17.5 g of 10% nitric acid aqueous solution were added to the ball mill, followed by shattering of the powder b-12, to thereby prepare a slurry having an average particle diameter of 3 μm (slurry b-21).

The slurry a-23 was coated on a honeycomb carrier (capacity 0.04 L) having a diameter of 36 mmφ, 400 cell, 6 mil, followed by drying and firing, to thereby prepare 140 g/L of a catalyst layer. Then, the slurry b-21 was coated on the thus prepared catalyst layer, followed by drying and firing, to thereby prepare 60 g/L of a catalyst layer. This catalyst layer was prepared for a sample of the comparative example 6. The thus prepared sample of the comparative example 6 is a catalyst carrying thereon 0.5712 g/L of Pt and 0.2344 g/L of Rh.

The following table 7 shows specifications of the thus obtained catalyst of each of the examples and comparative examples, and the P calculated according the expression (A).

TABLE 7

| Examples and comparative examples | Noble metal | Carrier concentration (%) | Promoter component C | Main component of carrier substrate | Noble metal | Carrier concentration (%) | Promoter component C | Main component of carrier substrate | P |
|---|---|---|---|---|---|---|---|---|---|
| Example 19 | Pt | 0.85 | CeZr compound oxide 70:30 | $Al_2O_3$ | Rh | 0.814 | ZrLa compound oxide 90:10 | $Al_2O_3$ | 0.32 |
| Example 20 | Pt | 0.85 | CeZr compound oxide 78:22 | $Al_2O_3$ | Rh | 0.814 | ZrLa compound oxide 95:5 | $Al_2O_3$ | 0.31 |
| Example 21 | Pt | 0.85 | CeZr compound oxide 85:15 | $Al_2O_3$ | Rh | 0.814 | ZrLa compound oxide 99:1 | $Al_2O_3$ | 0.32 |
| Comparative example 5 | Pt | 0.85 | CeZr compound oxide 60:40 | $Al_2O_3$ | Rh | 0.814 | ZrLa compound oxide 80:20 | $Al_2O_3$ | 0.07 |
| Comparative example 6 | Pt | 0.85 | CeZr compound oxide 90:10 | $Al_2O_3$ | Rh | 0.814 | ZrLa compound oxide 100:0 | $Al_2O_3$ | 0.07 |

Example 22

A cerium zirconium compound oxide particle having an average particle diameter of 30 nm was used as a first compound. Dinitrodiamine Pt was impregnated to this particle, to thereby prepare a cerium zirconium compound oxide particle (hereinafter referred to as "cerium zirconium compound oxide particle A") carrying thereon Pt 0.85%.

101.46 g of needle boehmite (10 nmφ×100 nm) containing moisture by 24.6% was inputted to a beaker, followed by adding thereto cerium nitrate for causing 4.5 g of cerium oxide, still followed by dispersing zirconyl nitrate in water for causing 9 g of zirconium oxide.

Then, 90 g of the cerium zirconium compound oxide particle A prepared in advance was added to the thus obtained, followed by dispersion through a high speed stirring. Then, this slurry was dried and fired, to thereby prepare a powder a-16 including the cerium zirconium compound oxide particle A coated with alumina.

168 g of this powder a-16, 7 g of boehmite alumina and 52.27 g of an active carbon powder were added to a ball mill. Then, 307.5 g of water and 17.5 g of 10% nitric acid aqueous solution were added to the ball mill, followed by shattering of the powder a-16, to thereby prepare a slurry having an average particle diameter of 3 μm (slurry a-24).

Then, rhodium nitrate was impregnated to a zirconium lanthanum compound oxide particle having an average particle diameter of 20 nm, to thereby prepare a particle B carrying thereon rhodium 0.814%. 118.42 g of needle boehmite containing moisture by 24% was inputted to a beaker, followed by dispersion in water and peptization by acid. Then, 90 g of the particle B prepared in advance was added to the thus obtained, followed by dispersion through a high speed stirring. Then, this slurry was dried and fired, to thereby prepare a powder b-1 including the particle B coated with alumina.

168 g of this powder b-1, 7 g of boehmite alumina and 52.27 g of an active carbon powder were added to a ball mill. Then, 307.5 g of water and 17.5 g of 10% nitric acid aqueous solution were added to the ball mill, followed by shattering of the powder b-1, to thereby prepare a slurry having an average particle diameter of 3 μm (slurry b-11).

The slurry a-24 was coated on a honeycomb carrier (capacity 0.04 L) having a diameter of 36 mmφ, 400 cell, 6 mil, followed by drying and firing, to thereby prepare a catalyst layer having 140 g/L coating. Then, the thus prepared catalyst layer was coated with the slurry b-11, followed by drying and firing, to thereby prepare a catalyst layer having 60 g/L coating. This catalyst layer was prepared for a sample of the example 22. The thus obtained sample of the example 22 is a catalyst carrying thereon 0.5712 g/L of Pt and 0.2344 g/L of Rh.

Example 23

A cerium zirconium compound oxide particle having an average particle diameter of 30 nm was used as a first compound. Dinitrodiamine Pt was impregnated to this particle, to thereby prepare a cerium zirconium compound oxide particle (hereinafter referred to as "cerium zirconium compound oxide particle A") carrying thereon Pt 0.85%.

101.46 g of needle boehmite (10 mm×100 nm) containing moisture by 24.6% was inputted to a beaker, followed by adding thereto cerium nitrate for causing 9 g of cerium oxide, still followed by dispersing zirconyl nitrate in water for causing 4.5 g of zirconium oxide. Then, 90 g of the cerium zirconium compound oxide particle A prepared in advance was added to the thus obtained, followed by dispersion through a high speed stirring. Then, this slurry was dried and fired, to thereby prepare a powder a-17 including the cerium zirconium compound oxide particle A coated with alumina.

168 g of this powder a-17, 7 g of boehmite alumina and 52.27 g of an active carbon powder were added to a ball mill. Then, 307.5 g of water and 17.5 g of 10% nitric acid aqueous solution were added to the ball mill, followed by shattering of the powder a-17, to thereby prepare a slurry having an average particle diameter of 3 μm (slurry a-25).

Then, rhodium nitrate was impregnated to a zirconium lanthanum compound oxide particle having an average particle diameter of 20 nm, to thereby prepare a particle B carrying thereon rhodium 0.814%. 118.42 g of needle boehmite containing moisture by 24% was inputted to a beaker, followed by dispersion in water and peptization by acid. Then, 90 g of the particle B prepared in advance was added to the thus obtained, followed by dispersion through a high speed stirring. Then, this slurry was dried and fired, to thereby prepare a powder b-1 including the particle B coated with alumina.

168 g of this powder b-1, 7 g of boehmite alumina and 52.27 g of an active carbon powder were added to a ball mill. Then, 307.5 g of water and 17.5 g of 10% nitric acid aqueous solution were added to the ball mill, followed by shattering of the powder b-1, to thereby prepare a slurry having an average particle diameter of 3 μm (slurry b-1).

The slurry a-25 was coated on a honeycomb carrier (capacity 0.04 L) having a diameter of 36 mmφ, 400 cell, 6 mil, followed by drying and firing, to thereby prepare a catalyst layer having 140 g/L coating. Then, the thus prepared catalyst layer was coated with the slurry b-1, followed by drying and firing, to thereby prepare a catalyst layer having 60 g/L coating. This catalyst layer was prepared for a sample of the example 23. The thus obtained sample of the example 23 is a catalyst carrying thereon 0.5712 g/L of Pt and 0.2344 g/L of Rh.

Example 24

A cerium zirconium compound oxide particle having an average particle diameter of 30 nm was used as a first compound. Dinitrodiamine Pt was impregnated to this particle, to thereby prepare a cerium zirconium compound oxide particle (hereinafter referred to as "cerium zirconium compound oxide particle A") carrying thereon Pt 0.85%.

111.14 g of needle boehmite (10 nmφ×100 nm) containing moisture by 24.6% was inputted to a beaker, followed by adding thereto cerium nitrate for causing 13.5 g of cerium oxide, still followed by dispersing zirconyl nitrate in water for causing 2.7 g of zirconium oxide. Then, 90 g of the cerium zirconium compound oxide particle A prepared in advance was added to the thus obtained, followed by dispersion through a high speed stirring. Then, this slurry was dried and fired, to thereby prepare a powder a-18 including the cerium zirconium compound oxide particle A coated with alumina.

168 g of this powder a-18, 7 g of boehmite alumina and 52.27 g of an active carbon powder were added to a ball mill. Then, 307.5 g of water and 17.5 g of 10% nitric acid aqueous solution were added to the ball mill, followed by shattering of the powder a-18, to thereby prepare a slurry having an average particle diameter of 3 μm (slurry a-26).

Then, rhodium nitrate was impregnated to a zirconium lanthanum compound oxide particle having an average particle diameter of 20 nm, to thereby prepare a particle B carrying thereon rhodium 0.814%. 118.42 g of needle boehmite containing moisture by 24% was inputted to a beaker, followed by dispersion in water and peptization by acid. Then, 90 g of the particle B prepared in advance was added to the thus obtained, followed by dispersion through a high speed stirring. Then, this slurry was dried and fired, to thereby prepare a powder b-1 including the particle B coated with alumina.

168 g of this powder b-1, 7 g of boehmite alumina and 52.27 g of an active carbon powder were added to a ball mill. Then, 307.5 g of water and 17.5 g of 10% nitric acid aqueous solution were added to the ball mill, followed by shattering of the powder b-1, to thereby prepare a slurry having an average particle diameter of 3 μm (slurry b-11).

The slurry a-26 was coated on a honeycomb carrier (capacity 0.04 L) having a diameter of 36 mmφ, 400 cell, 6 mil, followed by drying and firing, to thereby prepare a catalyst layer having 140 g/L coating. Then, the thus prepared catalyst layer was coated with the slurry b-11, followed by drying and firing, to thereby prepare a catalyst layer having 60 g/L coating. This catalyst layer was prepared for a sample of the example 24. The thus obtained sample of the example 24 is a catalyst carrying thereon 0.5712 g/L of Pt and 0.2344 g/L of Rh.

Comparative Example 7

A cerium zirconium compound oxide particle having an average particle diameter of 30 nm was used as a first compound. Dinitrodiamine Pt was impregnated to this particle, to thereby prepare a cerium zirconium compound oxide particle (hereinafter referred to as "cerium zirconium compound oxide particle A") carrying thereon Pt 0.85%.

About 87.3 g of $Al_2O_3$ (obtained by baking aluminum isopropoxide) was dissolved in 2-methyl 2, 4 pentane diol, then 1.8 g of cerium oxide (obtained by baking cerium acetyl acetonate) was added, then 0.9 g of zirconium oxide (obtained by baking zirconium acetyl acetonate) was added, then 90 g of the above particle A was added, and then water was added, thus implementing a hydrolysis. The water and an organic compound such as 2-methyl 2, 4 pentane diol and the like were evaporated and dried, followed by firing, to thereby prepare a powder a-19 including the particle A coated with alumina.

168 g of this powder b-19 and 7 g of boehmite alumina were added to a ball mill. Then, 307.5 g of water and 17.5 g of 10% nitric acid aqueous solution were added to the ball mill, followed by shattering of the powder b-19, to thereby prepare a slurry having an average particle diameter of 3 μm (slurry a-27).

Then, rhodium nitrate was impregnated to a zirconium lanthanum compound oxide particle having an average particle diameter of 20 nm, to thereby prepare a particle B carrying thereon rhodium 0.814%. About 90 g of aluminum isopropoxide as $Al_2O_3$ was dissolved in 2-methyl 2, 4 pentane diol, then added by 90 g of the particle B, and then added by water, thus implementing a hydrolysis. The water and an organic compound such as 2-methyl 2, 4 pentane diol and the like were evaporated and dried, followed by firing, to thereby prepare a powder b-2 including the particle B coated with alumina.

168 g of this powder b-2 and 7 g of boehmite alumina were added to a ball mill. Then, 307.5 g of water and 17.5 g of 10% nitric acid aqueous solution were added to the ball mill, followed by shattering of the powder b-2, to thereby prepare a slurry having an average particle diameter of 3 μm (slurry b-9).

140 g/L of the slurry a-27 was coated on a honeycomb carrier (capacity 0.04 L) having a diameter of 36 mmφ, 400 cell, 6 mil, followed by drying. Then, 60 g/L of the slurry b-9 was coated and dried, followed by firing at 400° C., to thereby prepare a sample of the comparative example 7. The thus prepared sample of the comparative example 7 is a catalyst carrying thereon 0.5712 g/L of Pt and 0.2344 g/L of Rh.

Comparative Example 8

A cerium zirconium compound oxide particle having an average particle diameter of 30 nm was used as a first comthen 18 g of cerium oxide (obtained by baking cerium acetyl acetonate) was added, then 13.5 g of zirconium oxide (obtained by baking zirconium acetyl acetonate) was added, then 90 g of the above particle A was added, and then water was added, thus implementing a hydrolysis. The water and an organic compound such as 2-methyl 2, 4 pentane diol and the like were evaporated and dried, followed by firing, to thereby prepare a powder a-20 including the particle A coated with alumina.

168 g of this powder a-20 and 7 g of boehmite alumina were added to a ball mill. Then, 307.5 g of water and 17.5 g of 10% nitric acid aqueous solution were added to the ball mill, followed by shattering of the powder a-20, to thereby prepare a slurry having an average particle diameter of 3 μm (slurry a-28).

Then, rhodium nitrate was impregnated to a zirconium lanthanum compound oxide particle having an average particle diameter of 20 nm, to thereby prepare a particle B carrying thereon rhodium 0.814%. About 90 g of aluminum isopropoxide as $Al_2O_3$ was dissolved in 2-methyl 2, 4 pentane diol, then added by 90 g of the particle B, and then added by water, thus implementing a hydrolysis. The water and an organic compound such as 2-methyl 2, 4 pentane diol and the like were evaporated and dried, followed by firing, to thereby prepare a powder b-2 including the particle B coated with alumina.

168 g of this powder b-2 and 7 g of boehmite alumina were added to a ball mill. Then, 307.5 g of water and 17.5 g of 10% nitric acid aqueous solution were added to the ball mill, followed by shattering of the powder b-2, to thereby prepare a slurry having an average particle diameter of 3 μm (slurry b-9).

140 g/L of the slurry a-28 was coated on a honeycomb carrier (capacity 0.04 L) having a diameter of 36 mmφ, 400 cell, 6 mil, followed by drying. Then, 60 g/L of the slurry b-9 was coated and dried, followed by firing at 400° C., to thereby prepare a sample of the comparative example 8. The thus prepared sample of the comparative example 8 is a catalyst carrying thereon 0.5712 g/L of Pt and 0.2344 g/L of Rh.

The following table 8 shows specifications of the thus obtained catalyst of each of the examples and comparative examples, and the P calculated according the expression (A).

TABLE 8

| Examples and comparative examples | Noble metal | Carrier concentration (%) | Promoter component C | Main component of carrier substrate | | Noble metal | Carrier concentration (%) | Promoter component C | Main component of carrier substrate | | P |
|---|---|---|---|---|---|---|---|---|---|---|---|
| Example 22 | Pt | 0.85 | CeZr compound oxide | $Al_2O_3$ | 5:10 | Rh | 0.814 | ZrLa compound oxide | $Al_2O_3$ | | 0.35 |
| Example 23 | Pt | 0.85 | CeZr compound oxide | $Al_2O_3$ | 10:5 | Rh | 0.814 | ZrLa compound oxide | $Al_2O_3$ | | 0.33 |
| Example 24 | Pt | 0.85 | CeZr compound oxide | $Al_2O_3$ | 15:3 | Rh | 0.814 | ZrLa compound oxide | $Al_2O_3$ | | 0.34 |
| Comparative example 7 | Pt | 0.85 | CeZr compound oxide | $Al_2O_3$ | 2:1 | Rh | 0.814 | ZrLa compound oxide | $Al_2O_3$ | | 0.07 |
| Comparative example 8 | Pt | 0.85 | CeZr compound oxide | $Al_2O_3$ | 20:15 | Rh | 0.814 | ZrLa compound oxide | $Al_2O_3$ | | 0.07 | pound. Dinitrodiamine Pt was impregnated to this particle, to thereby prepare a cerium zirconium compound oxide particle (hereinafter referred to as "cerium zirconium compound oxide particle A") carrying thereon Pt 0.85%.

About 58.5 g of $Al_2O_3$ (obtained by baking aluminum isopropoxide) was dissolved in 2-methyl 2, 4 pentane diol, Example 25

A cerium zirconium compound oxide particle having an average particle diameter of 30 nm was used as a first compound. Dinitrodiamine Pt was impregnated to this particle, to thereby prepare a cerium zirconium compound oxide particle (hereinafter referred to as "cerium zirconium compound oxide particle A") carrying thereon Pt 0.85%.

115.78 g of needle boehmite (10 nm$\phi$×100 nm) containing moisture by 24.6% was inputted to a beaker including water, then added by lanthanum nitrate for causing 2.7 g of lanthanum oxide, and followed by dispersion in water. Then, 90 g of the cerium zirconium compound oxide particle A prepared in advance was added to the thus obtained, followed by dispersion through a high speed stirring. Then, this slurry was dried and fired, to thereby prepare a powder a-21 including the cerium zirconium compound oxide particle A coated with alumina.

168 g of this powder a-21, 7 g of boehmite alumina and 52.27 g of an active carbon powder were added to a ball mill. Then, 307.5 g of water and 17.5 g of 10% nitric acid aqueous solution were added to the ball mill, followed by shattering of the powder a-21, to thereby prepare a slurry having an average particle diameter of 3 μm (slurry a-29).

Then, rhodium nitrate was impregnated to a zirconium lanthanum compound oxide particle having an average particle diameter of 20 nm, to thereby prepare a particle B carrying thereon rhodium 0.814%. 118.42 g of needle boehmite containing moisture by 24% was inputted to a beaker, followed by dispersion in water and peptization by acid. Then, 90 g of the particle B prepared in advance was added to the thus obtained, followed by dispersion through a high speed stirring. Then, this slurry was dried and fired, to thereby prepare a powder b-1 including the particle B coated with alumina.

168 g of this powder b-1, 7 g of boehmite alumina and 52.27 g of an active carbon powder were added to a ball mill. Then, 307.5 g of water and 17.5 g of 10% nitric acid aqueous solution were added to the ball mill, followed by shattering of the powder b-1, to thereby prepare a slurry having an average particle diameter of 3 μm (slurry b-1).

The slurry a-29 was coated on a honeycomb carrier (capacity 0.04 L) having a diameter of 36 mm$\phi$, 400 cell, 6 mil, followed by drying and firing, to thereby prepare a catalyst layer having 140 g/L coating. Then, the thus prepared catalyst layer was coated with the slurry b-11, followed by drying and firing, to thereby prepare a catalyst layer having 60 g/L coating. This catalyst layer was prepared for a sample of the example 25. The thus obtained sample of the example 25 is a catalyst carrying thereon 0.5712 g/L of Pt and 0.2344 g/L of Rh.

Example 26

A cerium zirconium compound oxide particle having an average particle diameter of 30 nm was used as a first compound. Dinitrodiamine Pt was impregnated to this particle, to thereby prepare a cerium zirconium compound oxide particle (hereinafter referred to as "cerium zirconium compound oxide particle A") carrying thereon Pt 0.85%.

113.40 g of needle boehmite (10 nm$\phi$×100 nm) containing moisture by 24.6% was inputted to a beaker including water, then added by lanthanum nitrate for causing 4.5 g of lanthanum oxide, and followed by dispersion in water. Then, 90 g of the cerium zirconium compound oxide particle A prepared in advance was added to the thus obtained, followed by dispersion through a high speed stirring. Then, this slurry was dried and fired, to thereby prepare a powder a-22 including the cerium zirconium compound oxide particle A coated with alumina.

168 g of this powder a-22, 7 g of boehmite alumina and 52.27 g of an active carbon powder were added to a ball mill. Then, 307.5 g of water and 17.5 g of 10% nitric acid aqueous solution were added to the ball mill, followed by shattering of the powder a-22, to thereby prepare a slurry having an average particle diameter of 3 μm (slurry a-30).

Then, rhodium nitrate was impregnated to a zirconium lanthanum compound oxide particle having an average particle diameter of 20 nm, to thereby prepare a particle B carrying thereon rhodium 0.814%. 118.42 g of needle boehmite containing moisture by 24% was inputted to a beaker, followed by dispersion in water and peptization by acid. Then, 90 g of the particle B prepared in advance was added to the thus obtained, followed by dispersion through a high speed stirring. Then, this slurry was dried and fired, to thereby prepare a powder b-1 including the particle B coated with alumina.

168 g of this powder b-1, 7 g of boehmite alumina and 52.27 g of an active carbon powder were added to a ball mill. Then, 307.5 g of water and 17.5 g of 10% nitric acid aqueous solution were added to the ball mill, followed by shattering of the powder b-1, to thereby prepare a slurry having an average particle diameter of 3 μm (slurry b-11).

The slurry a-30 was coated on a honeycomb carrier (capacity 0.04 L) having a diameter of 36 mm$\phi$, 400 cell, 6 mil, followed by drying and firing, to thereby prepare a catalyst layer having 140 g/L coating. Then, the thus prepared catalyst layer was coated with the slurry b-11, followed by drying and firing, to thereby prepare a catalyst layer having 60 g/L coating. This catalyst layer was prepared for a sample of the example 26. The thus obtained sample of the example 26 is a catalyst carrying thereon 0.5712 g/L of Pt and 0.2344 g/L of Rh.

Example 27

A cerium zirconium compound oxide particle having an average particle diameter of 30 nm was used as a first compound. Dinitrodiamine Pt was impregnated to this particle, to thereby prepare a cerium zirconium compound oxide particle (hereinafter referred to as "cerium zirconium compound oxide particle A") carrying thereon Pt 0.85%.

107.43 g of needle boehmite (10 nm$\phi$×100 nm) containing moisture by 24.6% was inputted to a beaker including water, then added by lanthanum nitrate for causing 9 g of lanthanum oxide, and followed by dispersion in water. Then, 90 g of the cerium zirconium compound oxide particle A prepared in advance was added to the thus obtained, followed by dispersion through a high speed stirring. Then, this slurry was dried and fired, to thereby prepare a powder a-23 including the cerium zirconium compound oxide particle A coated with alumina.

168 g of this powder a-23, 7 g of boehmite alumina and 52.27 g of an active carbon powder were added to a ball mill. Then, 307.5 g of water and 17.5 g of 10% nitric acid aqueous solution were added to the ball mill, followed by shattering of the powder a-23, to thereby prepare a slurry having an average particle diameter of 3 μm (slurry a-31).

Then, rhodium nitrate was impregnated to a zirconium lanthanum compound oxide particle having an average particle diameter of 20 nm, to thereby prepare a particle B carrying thereon rhodium 0.814%. 118.42 g of needle boehmite containing moisture by 24% was inputted to a beaker, followed by dispersion in water and peptization by acid. Then, 90 g of the particle B prepared in advance was added to the thus obtained, followed by dispersion through a high speed stirring. Then, this slurry was dried and fired, to thereby prepare a powder b-1 including the particle B coated with alumina.

168 g of this powder b-1, 7 g of boehmite alumina and 52.27 g of an active carbon powder were added to a ball mill. Then, 307.5 g of water and 17.5 g of 10% nitric acid aqueous solution were added to the ball mill, followed by shattering of the powder b-1, to thereby prepare a slurry having an average particle diameter of 3 μm (slurry b-11).

The slurry a-31 was coated on a honeycomb carrier (capacity 0.04 L) having a diameter of 36 mmφ, 400 cell, 6 mil, followed by drying and firing, to thereby prepare a catalyst layer having 140 g/L coating. Then, the thus prepared catalyst layer was coated with the slurry b-11, followed by drying and firing, to thereby prepare a catalyst layer having 60 g/L coating. This catalyst layer was prepared for a sample of the example 27. The thus obtained sample of the example 27 is a catalyst carrying thereon 0.5712 g/L of Pt and 0.2344 g/L of Rh.

Comparative Example 9

A cerium zirconium compound oxide particle having an average particle diameter of 30 nm was used as a first compound. Dinitrodiamine Pt was impregnated to this particle, to thereby prepare a cerium zirconium compound oxide particle (hereinafter referred to as "cerium zirconium compound oxide particle A") carrying thereon Pt 0.85%.

About 89.1 g of aluminum isopropoxide as $Al_2O_3$ was dissolved in 2-methyl 2, 4 pentane diol, then added by lanthanum acetate for causing 0.9 g of lanthanum oxide, then added by 90 g of the above particle A, and then added by water, thus implementing a hydrolysis. The water and an organic compound such as 2-methyl 2, 4 pentane diol and the like were evaporated and dried, followed by firing, to thereby prepare a powder a-24 including the particle A coated with alumina.

168 g of this powder a-24 and 7 g of boehmite alumina were added to a ball mill. Then, 307.5 g of water and 17.5 g of 10% nitric acid aqueous solution were added to the ball mill, followed by shattering of the powder a-24, to thereby prepare a slurry having an average particle diameter of 3 μm (slurry a-32).

Then, rhodium nitrate was impregnated to a zirconium lanthanum compound oxide particle having an average particle diameter of 20 nm, to thereby prepare a particle B carrying thereon rhodium 0.814%. About 90 g of aluminum isopropoxide as $Al_2O_3$ was dissolved in 2-methyl 2, 4 pentane diol, then added by 90 g of the particle B, and then added by water, thus implementing a hydrolysis. The water and an organic compound such as 2-methyl 2, 4 pentane diol and the like were evaporated and dried, followed by firing, to thereby prepare a powder b-2 including the particle B coated with alumina.

168 g of this powder b-2 and 7 g of boehmite alumina were added to a ball mill. Then, 307.5 g of water and 17.5 g of 10% nitric acid aqueous solution were added to the ball mill, followed by shattering of the powder b-2, to thereby prepare a slurry having an average particle diameter of 3 μm (slurry b-9).

140 g/L of the slurry a-32 was coated on a honeycomb carrier (capacity 0.04 L) having a diameter of 36 mmφ, 400 cell, 6 mil, followed by drying. Then, 60 g/L of the slurry b-9 was coated and dried, followed by firing at 400° C., to thereby prepare a sample of the comparative example 9. The thus prepared sample of the comparative example 9 is a catalyst carrying thereon 0.5712 g/L of Pt and 0.2344 g/L of Rh.

Comparative Example 10

A cerium zirconium compound oxide particle having an average particle diameter of 30 nm was used as a first compound. Dinitrodiamine Pt was impregnated to this particle, to thereby prepare a cerium zirconium compound oxide particle (hereinafter referred to as "cerium zirconium compound oxide particle A") carrying thereon Pt 0.85%.

About 76.5 g of aluminum isopropoxide as $Al_2O_3$ was dissolved in 2-methyl 2, 4 pentane diol, then added by lanthanum acetate for causing 13.5 g of lanthanum oxide, then added by 90 g of the above particle A, and then added by water, thus implementing a hydrolysis. The water and an organic compound such as 2-methyl 2, 4 pentane diol and the like were evaporated and dried, followed by firing, to thereby prepare a powder a-25 including the particle A coated with alumina.

168 g of this powder a-25 and 7 g of boehmite alumina were added to a ball mill. Then, 307.5 g of water and 17.5 g of 10% nitric acid aqueous solution were added to the ball mill, followed by shattering of the powder a-25, to thereby prepare a slurry having an average particle diameter of 3 μm (slurry a-33).

Then, rhodium nitrate was impregnated to a zirconium lanthanum compound oxide particle having an average particle diameter of 20 nm, to thereby prepare a particle B carrying thereon rhodium 0.814%. About 90 g of aluminum isopropoxide as $Al_2O_3$ was dissolved in 2-methyl 2, 4 pentane diol, then added by 90 g of the particle B, and then added by water, thus implementing a hydrolysis. The water and an organic compound such as 2-methyl 2, 4 pentane diol and the like were evaporated and dried, followed by firing, to thereby prepare a powder b-2 including the particle B coated with alumina.

168 g of this powder b-2 and 7 g of boehmite alumina were added to a ball mill. Then, 307.5 g of water and 17.5 g of 10% nitric acid aqueous solution were added to the ball mill, followed by shattering of the powder b-2, to thereby prepare a slurry having an average particle diameter of 3 μm (slurry b-9).

140 g/L of the slurry a-33 was coated on a honeycomb carrier (capacity 0.04 L) having a diameter of 36 mmφ, 400 cell, 6 mil, followed by drying. Then, 60 g/L of the slurry b-9 was coated and dried, followed by firing at 400° C., to thereby prepare a sample of the comparative example 10. The thus prepared sample of the comparative example 10 is a catalyst carrying thereon 0.5712 g/L of Pt and 0.2344 g/L of Rh.

The following table 9 shows specifications of the thus obtained catalyst of each of the examples and comparative examples, and the P calculated according the expression (A).

TABLE 9

| Examples and comparative examples | Noble metal | Carrier concentration (%) | Promoter component C | Main component of carrier substrate | | Noble metal | Carrier concentration (%) | Promoter component C | Main component of carrier substrate | P |
|---|---|---|---|---|---|---|---|---|---|---|
| Example 25 | Pt | 0.85 | CeZr compound oxide | $Al_2O_3$ | 3 | Rh | 0.814 | ZrLa compound oxide | $Al_2O_3$ | 0.35 |
| Example 26 | Pt | 0.85 | CeZr compound oxide | $Al_2O_3$ | 5 | Rh | 0.814 | ZrLa compound oxide | $Al_2O_3$ | 0.34 |
| Example 27 | Pt | 0.85 | CeZr compound oxide | $Al_2O_3$ | 10 | Rh | 0.814 | ZrLa compound oxide | $Al_2O_3$ | 0.33 |
| Comparative example 9 | Pt | 0.85 | CeZr compound oxide | $Al_2O_3$ | 1 | Rh | 0.814 | ZrLa compound oxide | $Al_2O_3$ | 0.07 |
| Comparative example 10 | Pt | 0.85 | CeZr compound oxide | $Al_2O_3$ | 15 | Rh | 0.814 | ZrLa compound oxide | $Al_2O_3$ | 0.08 |

(Evaluation of Exhaust Gas Purging Performance)

The exhaust gas purging catalysts according to the examples 11 to 27 and comparative examples 3 to 10 were rapidly deteriorated under the following conditions, to thereby measure HC conversion ratio, CO conversion ratio and NOx conversion ratio. Table 10 shows the thus obtained evaluation results.

| | |
|---|---|
| Engine displacement: | 2400 cc |
| Fuel: | Clear gasoline |
| Catalyst inlet temperature: | 400° C. |
| Conversion ratio: | Measured at A/F 14.6 (Amplitude: ±1.0 per Hz) |

TABLE 10

Evaluation of catalyst activation (exhaust gas purging performance)

| Examples and comparative examples | ηHC | ηCO | ηNOx |
|---|---|---|---|
| Example 11 | 80 | 81 | 79 |
| Example 12 | 84 | 85 | 83 |
| Example 13 | 89 | 90 | 88 |
| Example 14 | 92 | 93 | 91 |
| Example 15 | 94 | 95 | 93 |
| Example 16 | 96 | 97 | 95 |
| Example 17 | 92 | 93 | 91 |
| Example 18 | 95 | 96 | 94 |
| Example 19 | 96 | 97 | 95 |
| Example 20 | 95 | 96 | 94 |
| Example 21 | 97 | 98 | 96 |
| Example 22 | 93 | 94 | 92 |
| Example 23 | 94 | 95 | 93 |
| Example 24 | 93 | 94 | 92 |
| Example 25 | 92 | 93 | 91 |
| Example 26 | 94 | 95 | 93 |
| Example 27 | 91 | 92 | 90 |
| Comparative example 3 | 71 | 71 | 70 |
| Comparative example 4 | Unmeasurable (catalyst coat layer damaged) | | |
| Comparative example 5 | 70 | 70 | 69 |
| Comparative example 6 | 69 | 69 | 68 |
| Comparative example 7 | 71 | 71 | 70 |
| Comparative example 8 | 68 | 68 | 67 |
| Comparative example 9 | 72 | 72 | 71 |
| Comparative example 10 | 71 | 71 | 70 |

[Exhaust Gas Flow Rate's Effect on Catalytic Activation]

Figure 4:
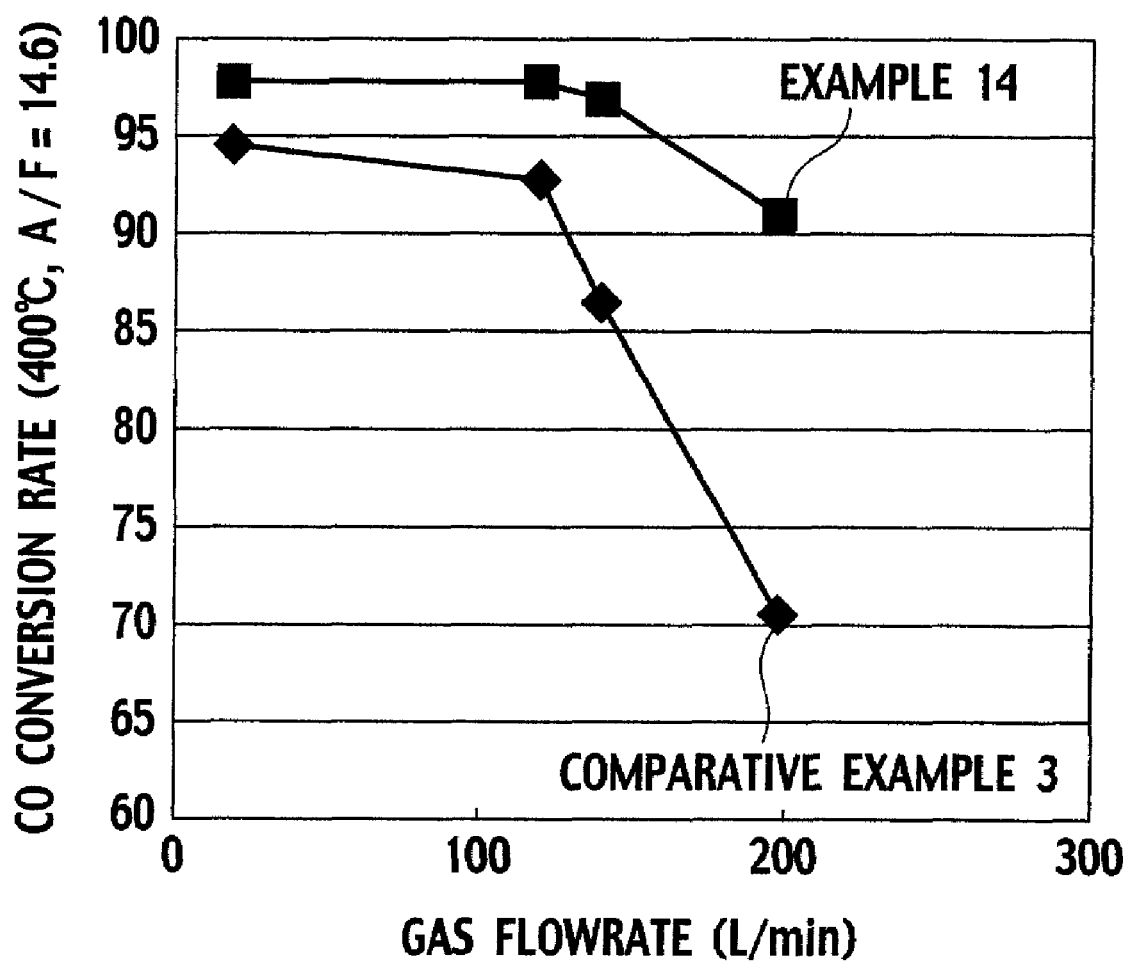
FIG. 4 is a graph showing gas flow rate relative to catalytic activation (CO conversion rate).

FIG. 4 shows how an exhaust gas flow rate influences the evaluation of the exhaust gas purging performance.

According to the comparative example 3, the exhaust gas flow rate becoming higher significantly decreases the exhaust gas purging performance.

Contrary to the above, the example 14 within the range of the present invention shows a far smaller decrease in the exhaust gas purging performance, thus keeping the high catalyst activation at the high flow rate.

Although the present invention has been described above by reference to a certain embodiment, the present invention is not limited to the embodiment described above. Modifications and variations of the embodiment(s) described above will occur to those skilled in the art, in light of the above teachings.

This application is based on a prior Japanese Patent Application Nos. P2006-337829 (filed on Dec. 15, 2006 in Japan) and P2007-202993 (filed on Aug. 3, 2007 in Japan). The entire contents of the Japanese Patent Application Nos. P2006-337829 and P2007-202993 from which priorities are claimed are incorporated herein by reference, in order to take some protection against translation errors or omitted portions.

The scope of the present invention is defined with reference to the following claims.

What is claimed is:

1. An exhaust gas purging catalyst, comprising:
an integrated carrier; and
a catalyst coat layer formed on the integrated carrier, the catalyst coat layer including a catalyst component and meeting a following expression (A):

$$P \geq 0.17W - 0.04 \quad (A)$$

wherein
P denotes a summation (ml) of a capacity of a void per mass (g) of the catalyst coat layer, the void having a pore diameter of 0.1 μm to 1 μm, and
W denotes a volume (ml) of the catalyst coat layer per the mass (g) of the catalyst coat layer.

2. The exhaust gas purging catalyst according to claim 1, wherein
the catalyst component is granular,
the granular catalyst components are in contact with or coupled with each other, thus forming the catalyst coat layer which is porous, and
in a range of 1 nm to 100 nm, the granular catalyst component has a peak of a pore diameter distribution.

3. The exhaust gas purging catalyst according to claim 1, wherein
the catalyst component includes:
a noble metal,
a cerium-contained oxide, and
at least one of an aluminum oxide and a zirconium oxide,
the noble metal is granular and has an average particle diameter of 2 nm to 10 nm,
the cerium-contained oxide is granular and has an average particle diameter of 5 nm to 30 mm
the noble metal is in contact with or coupled with the cerium-contained oxide, and
the cerium-contained oxide in contact with or coupled with the noble metal is coated with the at least one of the aluminum oxide and the zirconium oxide.

4. The exhaust gas purging catalyst according to claim 3, wherein
the cerium-contained oxide has the average particle diameter of 5 nm to 15 nm.

5. A method for producing an exhaust gas purging catalyst, the exhaust gas purging catalyst including an integrated carrier; and a catalyst coat layer formed on the integrated carrier, the catalyst coat layer including a catalyst component and meeting a following expression (A): $P \geqq 0.17W - 0.04$ - - - (A) wherein P denotes a summation (ml) of a capacity of a void per mass (g) of the catalyst coat layer, the void having a pore diameter of 0.1 μm to 1 μm, and W denotes a volume (ml) of the catalyst coat layer per the mass (g) of the catalyst coat layer, the method comprising:
preparing a slurry including:
the catalyst component, and
an active carbon having an average particle diameter of 1.0 μm or less;
coating the slurry on the integrated carrier; and
firing the slurry.

6. The method according to claim 5, wherein the firing of the slurry is implemented at 300° C. to 500° C.

* * * * *